US011861998B2

(12) United States Patent
Alessi et al.

(10) Patent No.: US 11,861,998 B2
(45) Date of Patent: Jan. 2, 2024

(54) SYSTEM AND METHOD FOR DETECTING A PRESENCE IN A CLOSED ENVIRONMENT TO BE MONITORED, FOR ANTI-INTRUSION OR ANTI-THEFT PURPOSE

(71) Applicant: STMicroelectronics S.r.l., Agrate Brianza (IT)

(72) Inventors: Enrico Rosario Alessi, Catania (IT); Fabio Passaniti, Syracuse (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 17/742,177

(22) Filed: May 11, 2022

(65) Prior Publication Data

US 2022/0366768 A1 Nov. 17, 2022

(30) Foreign Application Priority Data

May 17, 2021 (IT) ........................ 102021000012665

(51) Int. Cl.
*G08B 13/16* (2006.01)
*G08B 13/24* (2006.01)

(52) U.S. Cl.
CPC ......... *G08B 13/1645* (2013.01); *G08B 13/24* (2013.01)

(58) Field of Classification Search
CPC ........................... G08B 13/1645; G08B 13/24; G08B 13/2494; G08B 29/188
See application file for complete search history.

(56) References Cited

U.S. PATENT DOCUMENTS 5,844,415 A 12/1998 Gershenfeld et al.
6,188,318 B1 2/2001 Katz et al.
2005/0231353 A1 10/2005 DiPoala et al.
2006/0145842 A1 * 7/2006 Stilp .................. H04W 12/126 340/539.22

(Continued)

FOREIGN PATENT DOCUMENTS

EP 2533219 A1 12/2012
EP 2980609 A1 2/2016

(Continued)

OTHER PUBLICATIONS

Amoruso et al., “An improved model of man for ESD applications,” *Journal of Electrostatics*, vol. 49: 225-244, Apr. 2000.

(Continued)

*Primary Examiner* — Joseph H Feild
*Assistant Examiner* — Sharmin Akhter
(74) *Attorney, Agent, or Firm* — SEED INTELLECTUAL PROPERTY LAW GROUP LLP

(57) ABSTRACT

A system for detecting a presence in an environment to be monitored includes an electrostatic charge variation sensor, a vibration sensor, and an environmental pressure sensor. A processing unit is configured to acquire, from the electrostatic charge variation sensor, an electrostatic charge variation signal, and detect in the electrostatic charge variation signal, first signal characteristics indicative of the presence of a subject in the environment to be monitored. The processing unit further validates the detection of presence of the subject using the vibration and pressure signals provided by the other sensors.

24 Claims, 11 Drawing Sheets

(56) References Cited

U.S. PATENT DOCUMENTS

| | | | |
|---|---|---|---|
| 2014/0232516 A1 | 8/2014 | Stivoric et al. | |
| 2016/0342781 A1 | 11/2016 | Jeon | |
| 2019/0227188 A1* | 7/2019 | Aponte Luis | G01V 3/08 |
| 2021/0020008 A1 | 1/2021 | Deutsch | |

FOREIGN PATENT DOCUMENTS

| | | |
|---|---|---|
| JP | 2011044037 A | 3/2011 |
| KR | 20110061750 A | 6/2011 |

OTHER PUBLICATIONS

Ficker, T, "Electification of human body by walking," Journal of Electrostatics, vol. 64: 10-16, 2006.

Kurita, K., "Developement of Non-Contact Measurement System of Human Stepping," *SICE Annual Conference, The University Electo-Communications*, Japan, Aug. 20-22, 2008, 4 pgs.

Takiguchi et al., "Human Body Detection that Uses Electric Field by Walking," *Journal of Advanced Mechanical Design, Systems, and Manufacturing* 1(3): 294-305, 2007.

* cited by examiner

SYSTEM AND METHOD FOR DETECTING A PRESENCE IN A CLOSED ENVIRONMENT TO BE MONITORED, FOR ANTI-INTRUSION OR ANTI-THEFT PURPOSE

BACKGROUND

Technical Field

The present disclosure relates to a system and a method for detecting a presence in an environment to be monitored, for example for anti-theft or anti-intrusion purpose.

Description of the Related Art

Electric field sensors are used in alternative or in addition to accelerometer sensors for determining a user's activity, or for helping interpret the signals generated by other sensor devices.

In conductors, the electrical charges have a certain freedom of movement, and for this reason they will tend to position so as to remain as far away as possible from each other, distributing over the entire surface of the conductor.

In the presence of an external electric field, the electrons move until they reach a steady condition; the electric field inside the conductor is zero and immediately outside the conductor is perpendicular to it. The charges on the surface crowd where the radius of curvature is smaller (point effect). The electric charges may be transferred from one conductor to another by contact. Furthermore, the electric charges may be generated on a conductor by induction.

In insulators, instead, the atomic structure does not allow the charges to move, on the contrary it tends to retain them in the place where they were produced: the charge will therefore be localized. The insulators may be charged by rubbing (triboelectric effect). In the presence of an external electric field there are no charges free to move, but the molecules of the dielectric "deform" due to the repulsion between charges having the same sign and dipoles are created (bias), which make the dielectric macroscopically charged.

Nowadays there are many technologies and products that deal with anti-intrusion application and presence detection. Here is a list of the most common approaches for detecting an intrusion: Thermal image of a subject through infrared sensors; Passive infrared reacting to temperature variation (PIR); Active infrared wherein a ray from an emission point and a reception point is interrupted; Emission of microwaves being reflected by a subject, with the possibility of also measuring the speed of the subject; Ultrasound; use of beam-type photoelectric devices; use of microphones; use of cameras.

All the above-mentioned methods offer strengths and weaknesses in detecting an unwanted intrusion. This is the reason why the most robust and sophisticated systems combine multiple technologies together. For example, the passive infrared sensors are sensitive to environmental temperatures, while microwave anti-intrusion systems are unable to detect behind metal objects. In addition, a fluorescent light or a slight movement may trigger alarms. For this reason, dual technology based on the combination of PIR and microwaves is quite common. By crossing both information and alarms, an anti-intrusion system becomes more reliable with respect to false positives and unwanted alarms, and attains further advantages such as immunity with respect to pets. Below are some examples of the prior art.

Patent document EP2533219 describes an anti-intrusion system comprising at least one microwave detection device, for detecting the unauthorized entry of a subject into an area under surveillance; the detection device comprising an emitting antenna for emitting microwaves and a receiving antenna for receiving the reflected signal.

Patent document U.S. Pat. No. 6,188,318 describes a microwave plus PIR dual technology intrusion detector with immunity to pets.

Patent document EP1587041 describes an intrusion detection system comprising a passive infrared optic and a microwave transceiver.

Devices detecting the variation of the electric field generated by a person during the movements of the same, or exploiting a capacitive-type detection are also known. Technologies using the latter type of detection include, for example, touch screens, systems for detecting the position of the occupants in automobiles, and devices for determining the position, the orientation and the mass of an object, such as, for example, described in patent document U.S. Pat. No. 5,844,415 regarding an electric field detection device for determining the position, the mass distribution and the orientation of an object within a defined space, arranging a plurality of electrodes within the defined space. This technical solution could also be used to recognize a user's gestures, hand position and orientation, for example for interactive use with a processing system, in place of a mouse or a joystick.

Patent document KR20110061750 refers to the use of an electrostatic sensor in association with an infrared sensor for detecting the presence of an individual. The specific application relates to the automatic opening/closing of a door. Patent document EP2980609 relates to the use of an electrostatic field sensor in addition to a magnetic sensor for detecting a human presence in an environment.

The scientific document by K. Kurita, "Development of Non-Contact Measurement System of Human Stepping," SICE Annual Conference 2008, Japan, illustrates a system and a method for counting the steps taken by a subject exploiting a contactless technique. This technique provides for detecting the electrostatic induction current, generated as a direct consequence of the movement of the subject in the environment, through an electrode placed at a distance of 1.5 m from the subject. However, the experiment illustrated in this document is carried out under ideal conditions and is a mere demonstration of the applicability of the technology to step counting.

BRIEF SUMMARY

Some disadvantages of prior approaches are already highlighted in the background section above. Moreover, none of the above-mentioned documents teaches a system and/or a method for detecting a presence in an environment to be monitored, in particular for anti-intrusion or anti-theft purposes, for being implemented minimizing the number of sensors cooperating with each other, while ensuring high reliability.

The need is therefore felt to make up for the shortcomings of the prior art by providing a system and a method for detecting a presence in an environment to be monitored.

According to the present disclosure, a system and a method for detecting a presence in an environment to be monitored are provided.

In at least one embodiment, a system for detecting a presence in an environment to be monitored is provided that includes a processor, and an electrostatic charge variation sensor coupled to the processor and configured to detect a variation of electrostatic charge in the environment and generate an electrostatic charge variation signal. The system further includes one of a vibration sensor operatively coupled to the environment to be monitored and configured to detect an environmental vibration in the environment to be monitored and generate a vibration signal, or an environmental pressure sensor operatively coupled to the environment to be monitored and configured to detect an environmental pressure in the environment to be monitored and generate a pressure signal. The processor is configured to: acquire, from the electrostatic charge variation sensor, the electrostatic charge variation signal; detect, in said electrostatic charge variation signal, first signal characteristics indicative of the presence of a subject in said environment to be monitored; acquire, from said one of the vibration sensor or the environmental pressure sensor, respectively the vibration signal or the pressure signal; detect, in said vibration signal or pressure signal acquired, respective second signal characteristics indicative of the presence of the subject in said environment to be monitored; and generate a warning signal if both the first and the second signal characteristics have been detected.

In at least one embodiment, a method for detecting a presence in an environment to be monitored is provided that includes: detecting, by an electrostatic charge variation sensor, a variation of electrostatic charge in said environment and generating an electrostatic charge variation signal; detecting, by one of a vibration sensor or an environmental sensor operatively coupled to the environment to be monitored, respectively, an environmental vibration in the environment to be monitored and generating a vibration signal or an environmental pressure in the environment to be monitored and generating a pressure signal; acquiring, by a processor, from the electrostatic charge variation sensor, the electrostatic charge variation signal; detecting, by the processor, in said electrostatic charge variation signal, first signal characteristics indicative of the presence of a subject in said environment to be monitored; acquiring, by the processor, from said one of the vibration sensor or the environmental pressure sensor, respectively the vibration signal or the pressure signal; detecting, by the processor, in said vibration signal or pressure signal acquired, respective second signal characteristics indicative of the presence of the subject in said environment to be monitored; and generating, by the processor, a warning signal if both the first and the second signal characteristics have been detected.

BRIEF DESCRIPTION OF THE SEVERAL VIEWS OF THE DRAWINGS

For a better understanding of the disclosure, embodiments thereof are now described, purely by way of non-limiting example and with reference to the attached drawings, wherein.

DETAILED DESCRIPTION

Figure 1:
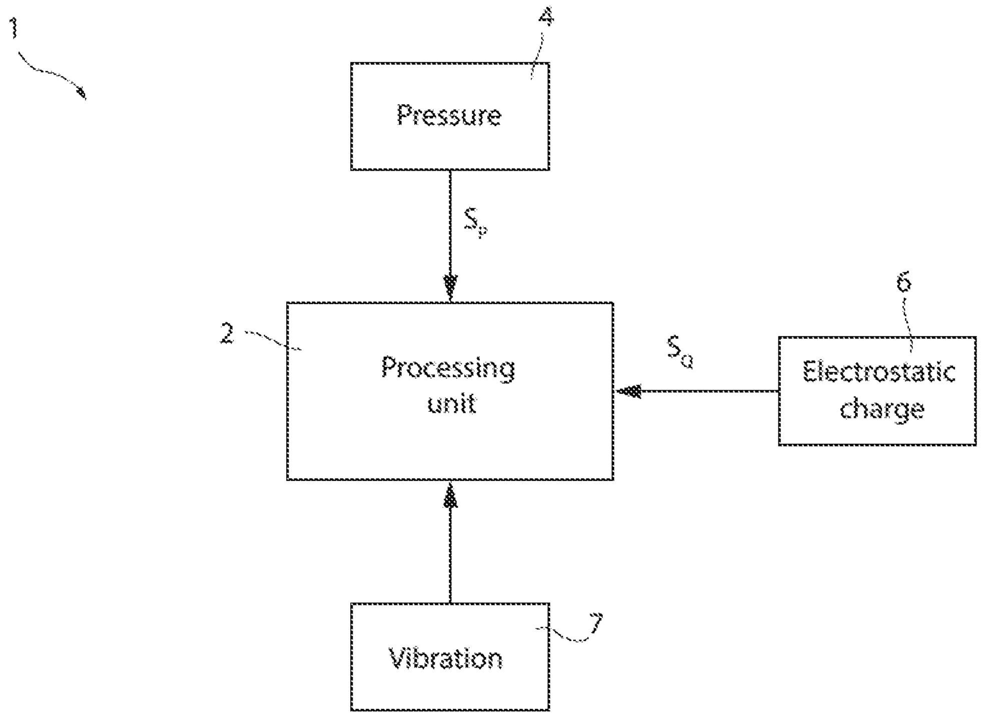
FIG. 1 schematically illustrates a system for detecting a presence including an environmental electric charge sensor, a pressure sensor and a vibration sensor (in particular a multi-axial accelerometer) operatively coupled to a processing unit, according to an embodiment of the present disclosure.

FIG. 1 schematically illustrates a presence detection system, or anti-intrusion system, 1. The presence detection system 1 is in particular for detecting a human presence in an environment and comprises a processing unit 2, a pressure sensor 4, coupled to the processing unit 2, an electrostatic charge variation sensor 6 coupled to the processing unit 2, and a vibrational sensor 7, in particular an accelerometer, also coupled to the processing unit 2 (hereinafter reference will explicitly be made to the accelerometer, without thereby losing generality). The pressure sensor 4, the electrostatic charge variation sensor 6 and the accelerometer 7 are arranged in the environment to be monitored; the processing unit 2 (which may be referred to herein as a processor, and which may be or include any electrical features, circuitry, or the like suitable for performing the functions described herein with respect to the processing unit, such as, for example, a computer including a micro-controller) may also be arranged in the environment to be monitored, in another adjacent environment or be of remote type, also arranged at a great distance from the environment to be monitored. The connection between the processing unit 2 and the aforementioned pressure sensor 4, electrostatic charge sensor 6 and accelerometer 7 may be implemented via cable or wireless, according to any of the available technologies.

The processing unit 2 is configured to receive, and receives during use: a signal $S_Q$, correlated to a variation of the environmental electrical charge in the monitored environment, from the electrostatic charge variation sensor 6; a signal $S_A$, indicative of a vibration detected in the environment monitored by the accelerometer 7; and a signal $S_P$, indicative of a pressure (or variation of pressure) detected in the environment monitored by the accelerometer 7.

The pressure sensor 4 is arranged in the environment wherein it is desired to detect a human presence, or operatively coupled to this environment, to detect a variation of environmental pressure caused for example by the opening of a door or a window, or indicative of the entry of a foreign subject into this environment. In this case, therefore, the environment to be monitored is a closed environment, such as, for example, a room in an apartment or home. In fact, it should be remembered that the system 1 according to the present disclosure has the objective of identifying an unwanted entry into an environment to be protected, in particular for anti-theft purpose. When the system 1 is operative, the pressure detected is the environmental pressure present therein, which typically varies relatively slowly between day and night hours, due to air heating, or in conjunction with a variation in weather/climatic conditions. Any significant disturbance of this pressure may be indicative of an infringement.

Similarly, the accelerometer 7 is also arranged in the environment wherein it is desired to detect a human presence, to detect any vibrations in this environment that might be correlated to an intruder's footsteps, in particular footsteps caused by a person who has entered such an environment.

Similarly, the electrostatic charge variation sensor 6 is also arranged in the environment wherein it is desired to detect the human presence, or operatively coupled to this environment, to detect a variation of the environmental electrostatic charge caused by the entry of a foreign subject into this environment.

The analysis of the signals generated by the aforementioned sensors, and their suitable combination, allows the entry, in the environment to be monitored, of a subject or an intruder to be detected, discriminating with respect to false positives.

Figure 2:
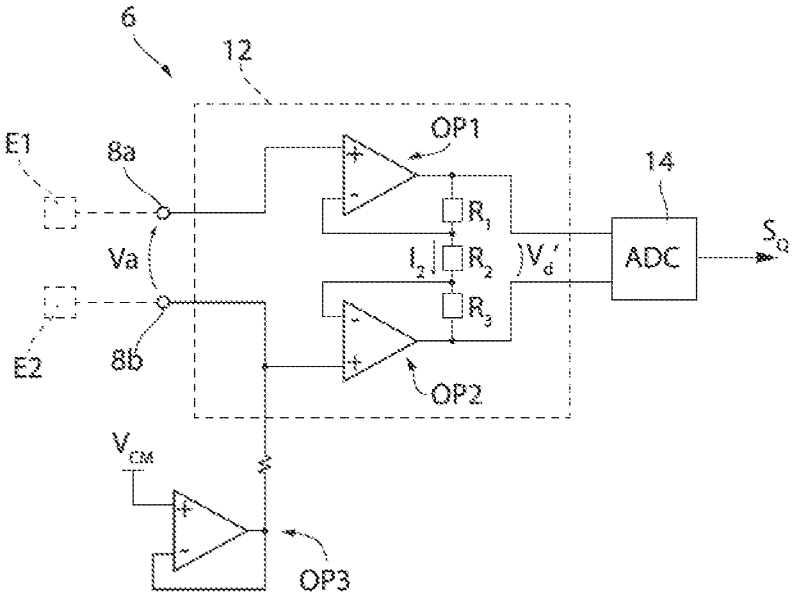
FIG. 2 illustrates an embodiment of the environmental electrostatic charge variation sensor.

FIG. 2 illustrates an exemplary and non-limiting embodiment of the electrostatic charge variation sensor 6. The electrostatic charge variation sensor 6 comprises a pair of input terminals 8*a*, 8*b*, coupled to input electrodes E1, E2, respectively.

The two electrodes may be connected to a differential input (i.e., to the positive/negative "+"/"−" input pair of an amplifier stage or an ADC converter). Particular cases of this general configuration (which do not require changes to the electric diagram of FIG. 2) may provide for the use of an electrode (e.g., E1) of predominant dimensions with respect to the other electrode (e.g., E2) to the point of making this second electrode (E2), and the environmental charge variation detected thereby, completely negligible; in other cases, the second electrode (E2) may be removed.

In this embodiment, one of the electrodes E1, E2 (e.g., E2) is coupled to a reference potential, having constant value (e.g., common mode voltage, or VCM, typically half of the supply voltage of the device), while the other electrode of the electrodes E1, E2 (e.g., E1) is, for example, made of conductive material and coated with an insulating layer. The geometry of the electrode E1 determines the sensitivity which, as a first approximation, is proportional to the surface of the electrode itself. In an exemplary embodiment, the electrode E1 sensitive to the environmental charge is of square shape, with a side equal to about 2-10 cm, for example 5 cm. Other examples comprise electrodes made using conductive wires coated with insulator, having a length equal to a few centimeters or a few tens of centimeters, e.g., 10 cm-20 cm.

In particular, the input electrodes E1, E2 are arranged in the environment wherein it is desired to detect a human presence, while the rest of the electrostatic charge variation sensor 6 (e.g., the amplification stage, described hereinafter) may also be arranged outside the environment to be monitored, or inside this environment, indifferently.

The pair of input terminals 8*a*, 8*b* receives an input voltage Vd (differential signal), being supplied to an instrumentation amplifier 12. In a per se known manner, a human presence generates a variation of the environmental electrostatic charge which, in turn, after having been detected by the electrode E1, generates the input voltage Vd.

The instrumentation amplifier 12 comprises, in an exemplary embodiment, two operational amplifiers OP1 and OP2 and a biasing stage (buffer) OP3 having the function of biasing the instrumentation amplifier 12 to a common mode voltage VCM.

The inverting terminal of the amplifier OP1 is connected to the inverting terminal of the amplifier OP2 by means of a resistor $R_2$ having a voltage equal to the input voltage Vd at its ends; therefore, a current equal to $I_2=Vd/R_2$ will flow through this resistor $R_2$. This current $I_2$ does not come from the input terminals of the operational amplifiers OP1, OP2 and therefore flows through the two resistors $R_1$ connected between the outputs of the operational amplifiers OP1, OP2, in series with the resistor $R_2$; the current $I_2$, therefore flowing through the series of the three resistors $R_1$–$R_2$-$R_1$, produces an output voltage Vd' given by $Vd'=(2R_1+R_2)I_2=(2R_1+R_2)Vd/R_2$. Therefore, the overall gain of the circuit of FIG. 2 is $Ad=Vd'/Vd=(2R_1+R_2)/R_2=+2R_1/RR_2$. The differential gain depends on the value of the resistor R2 and may therefore be modified by acting on the resistor $R_2$.

The differential output Vd', therefore being proportional to the potential Vd between the input electrodes 8*a*, 8*b*, is provided at input to an analog-to-digital converter 14, which provides at output the charge variation signal $S_Q$ for the processing unit 2. The charge variation signal $S_Q$ is, for example, a high-resolution digital stream (16 bits or 24 bits). The analog-to-digital converter 14 is optional, since the processing unit 2 may be configured to work directly on the analog signal, or may itself comprise an analog-to-digital converter for converting the signal Vd'.

Alternatively, in presence of the analog-to-digital converter 14, the instrumentation amplifier 12 may be omitted, so that the analog-to-digital converter 14 receives the differential voltage Vd between the electrodes E1, E2 and samples this signal Vd directly.

The pressure sensor 4 is for example a pressure sensor made using MEMS technology. Examples of pressure sensors usable in the context of the present disclosure include pressure sensors with a measuring range of 200 mbar-2000 mbar and with accuracy (absolute precision) of a few mbar units; however, operating around the environmental pressure, approximately 1000 mbar, and observing relative values around it, a relevant parameter is the ability to detect variations around a working point, that is high resolution over time and amplitude and low inherent noise. Examples of sensors for this purpose include sensors with a resolution of 1 Pascal (1/100 of mbar), data rate equal to 200 Hz, RMS noise level equal to 0.5 Pascal (without filters applied).

In respective embodiments, other pressure sensors (other than MEMS sensors) are however usable.

The vibration sensor 7 is, as mentioned and in one embodiment, an accelerometer, for example of three-axis or six-axis type made using MEMS technology, or a sensor including the combination of accelerometer and gyroscope.

Figure 3A:
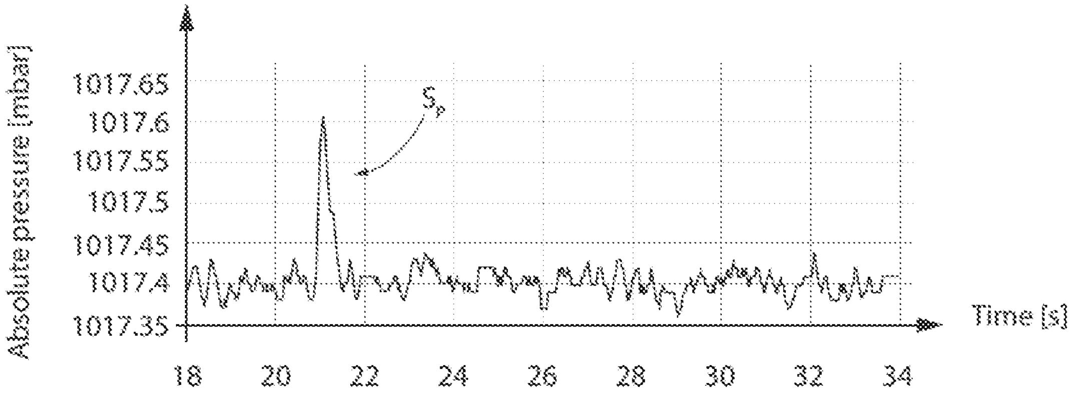
FIG. 3A illustrates an example of a pressure signal Sp generated by the pressure sensor of FIG. 1.

FIG. 3A illustrates an example of pressure signal Sp (raw signal) generated by the pressure sensor 4. The abscissa axis is the time, the ordinate axis is the absolute pressure values in millibars. As noted from FIG. 3A, there is a background noise and, at the time instant t=21 s, a peak 15 which differs considerably from this background noise, caused by a variation of environmental pressure, for example due to the opening of a door.

Figure 3B:
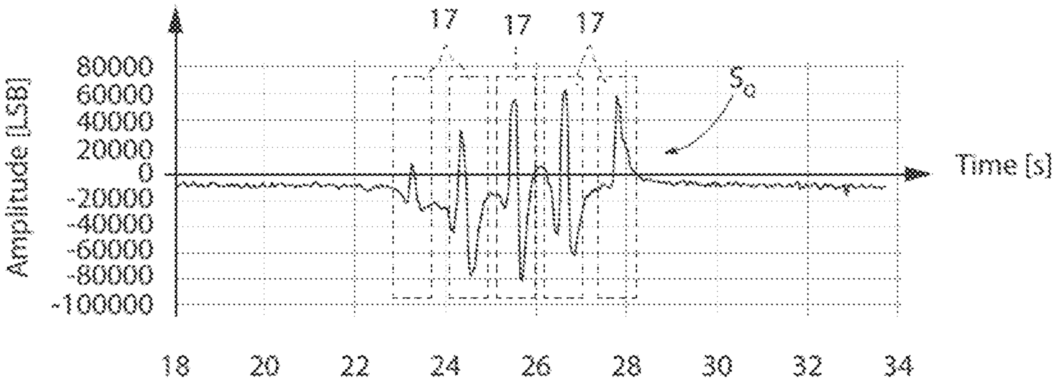
FIG. 3B illustrates an example of an electrostatic charge variation signal generated by the electrostatic charge variation sensor of FIG. 1.

FIG. 3B illustrates an example of an electrostatic charge variation signal $S_Q$ (raw signal), generated by the electrostatic charge variation sensor 6. The abscissa axis is the time axis (in seconds, using the same time scale of FIG. 3A). The ordinate axis is the amplitude of the signal, LSB ("Least Significant Bit"), that is the minimum digital value at the output of the analog-to-digital converter, which is proportional to the voltage detected at the input electrode E1. Typically, 1 LSB corresponds to a value comprised between a few μV and a few tens of μV. The proportionality constant (or sensitivity) depends on the gain of the amplifier, on the resolution of the analog-to-digital converter and on any digital processing (e.g., oversampling, decimation, etc.). The representation in LSB is common in the art and disregards a quantification in physical units, as the aim is typically to detect relative variations, with respect to a steady or base state. The time relative to the start of the measurement is represented on the abscissa axis of the charge variation signal $S_Q$. Being the sampling frequency, in the illustrated example, equal to 200 Hz, 200 samples correspond to each second reported on the abscissas.

As can be seen from FIG. 3B, the electrostatic charge variation sensor 6 detects the presence of the subject in the environment with a certain delay (here, about 2 seconds) with respect to the pressure sensor 4. The delay is due to the fact that, in the illustrated example, the steps in the monitored environment are not immediately successive the opening of the door; if they were, this delay would consequently be reduced up to zero in the event that the opening of the door coincides with the execution of steps in the monitored environment. The charge variation signal $S_Q$ shows a series of positive and negative peaks, which follow each other, and which identify the type of movement (here, in particular, the steps) executed by the subject in the environment. In particular, five steps may be identified, identified by a positive peak and an immediately following negative peak, delimited by respective rectangles 17 in dashed line in FIG. 3B.

Figure 3C:
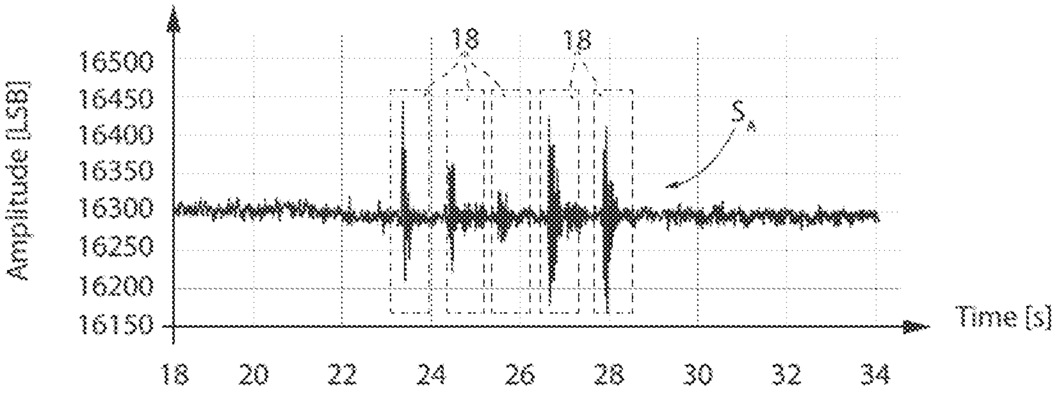
FIG. 3C illustrates an example of a vibration signal generated by the accelerometer of FIG. 1 and partially processed by the processing unit of FIG. 1 in order to generate the modulus of the sensing axial components.

FIG. 3C illustrates an example of a vibration signal SA generated by the accelerometer 7 and partially processed in order to generate the modulus of the axial sensing components. The abscissa axis is the time axis (in seconds, using the same time scale as FIGS. 3A and 3B), while the ordinate axis is the amplitude of the vibration signal $S_A$ in LSB. In this example an accelerometer having three detection axes was used, configured to detect three signals $S_{Ax}$, $S_{Ay}$, $S_{Az}$ respectively along the X-, Y-, Z-axes of a Cartesian triaxial reference system. Since the orientation of the accelerometer 7 in the environment to be monitored is not predictable in advance, according to the present disclosure the signal $S_A$ is generated by calculating the modulus of the acceleration, through the three components $S_{Ax}$, $S_{Ay}$, $S_{Az}$, detected on each of the three axes of the accelerometer, according to the operation:

$$S_A=\sqrt{S_{Ax}^2+S_{Ay}^2+S_{Az}^2}$$

As can be seen from FIG. 3C, the accelerometer 7 detects vibrations, in the form of a plurality of close positive and negative peaks, which differ from the background noise, identifying the respective steps of the subject in the environment. In particular, five steps may be identified, substantially concurrent to the steps identified by the electrostatic charge variation sensor 6, delimited by respective rectangles 18 in dashed line in FIG. 3C. In order to be able to process the signals of FIGS. 3A-3C for the identification and extraction of the relevant characteristics to identify the presence of the subject in the environment, an aspect of the present disclosure provides for eliminating the background component, similar to the average value (DC) of the signal, also called "baseline." Known-type algorithms may be used to remove the baseline or the background signal, for example based on the calculation of the average value of the raw signal and subtraction of this average value from the raw signal; alternatively, it is possible to use algorithms or methods specifically provided for this purpose, as for example illustrated hereinafter with reference to FIGS. 11 and 12.

Figure 4A:
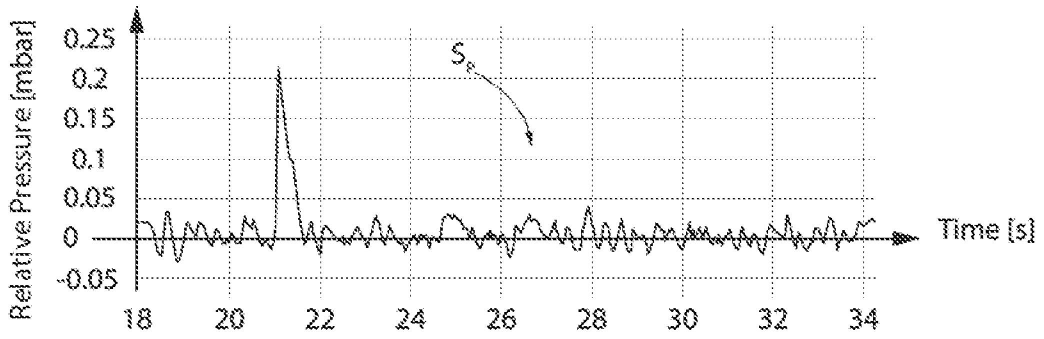
FIG. 4A illustrates the pressure signal of FIG. 3A after the removal of one of its background components, or baseline.
Figure 4B:
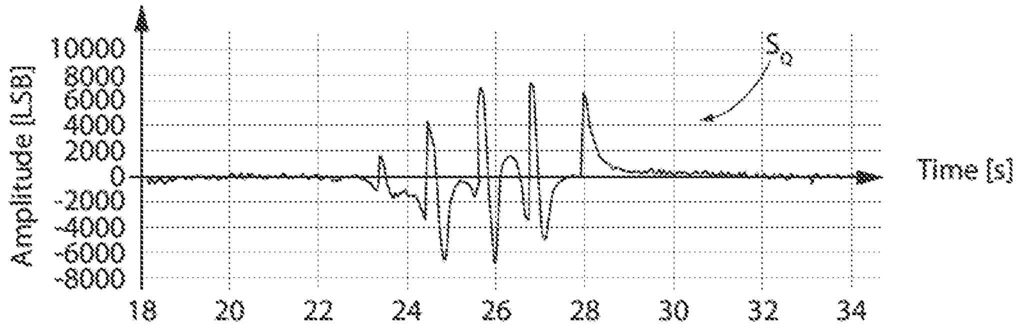
FIG. 4B illustrates the electrostatic charge variation signal of FIG. 3B after the removal of the relative baseline.
Figure 4C:
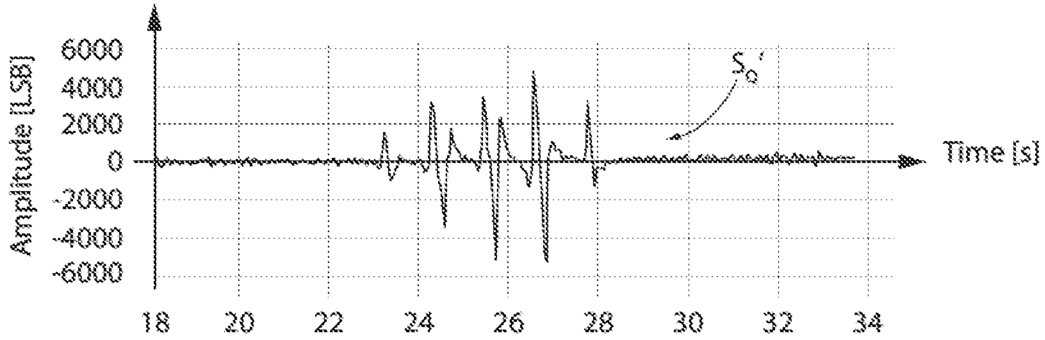
FIG. 4C illustrates the first derivative of the electrostatic charge variation signal of FIG. 4B.
Figure 4D:
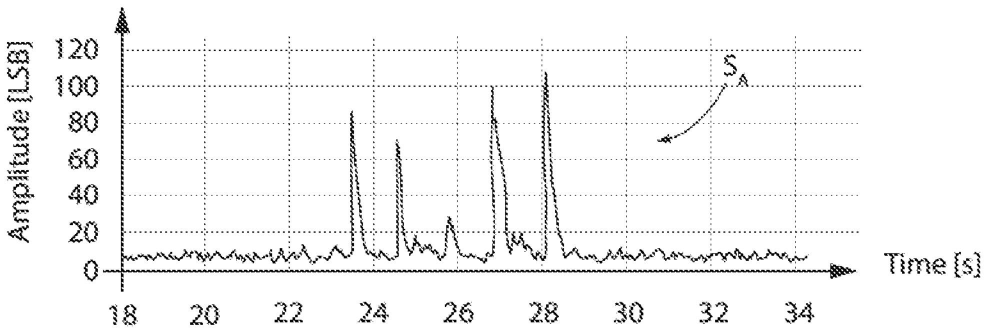
FIG. 4D illustrates the envelope, or AC component, of the vibration signal of FIG. 3C.

FIGS. 4A, 4B and 4D respectively illustrate the signals of FIGS. 3A, 3B and 3C after respective processing aimed at removing the background component, or baseline. Hereinafter in the present description, the same references $S_P$, $S_Q$ and $S_A$ will be used for the raw signals of FIGS. 3A-3C and for the signals subject to processing of FIGS. 4A, 4B and 4D, since the teaching of the present disclosure applies indifferently using raw or processed signals.

In particular: FIG. 4A illustrates the pressure signal Sp of FIG. 3A after the removal of the baseline; FIG. 4B illustrates the electrostatic charge variation signal $S_Q$ of FIG. 3B after the removal of the relative baseline; FIG. 4C illustrates the first derivative $S_Q'$ of the electrostatic charge variation signal $S_Q$ of FIG. 4B; and FIG. 4D illustrates the variations of the signal of FIG. 3C with respect to the average value of this signal (i.e., the "AC component" of the vibration signal $S_A$ of FIG. 3C).

Figure 5A:
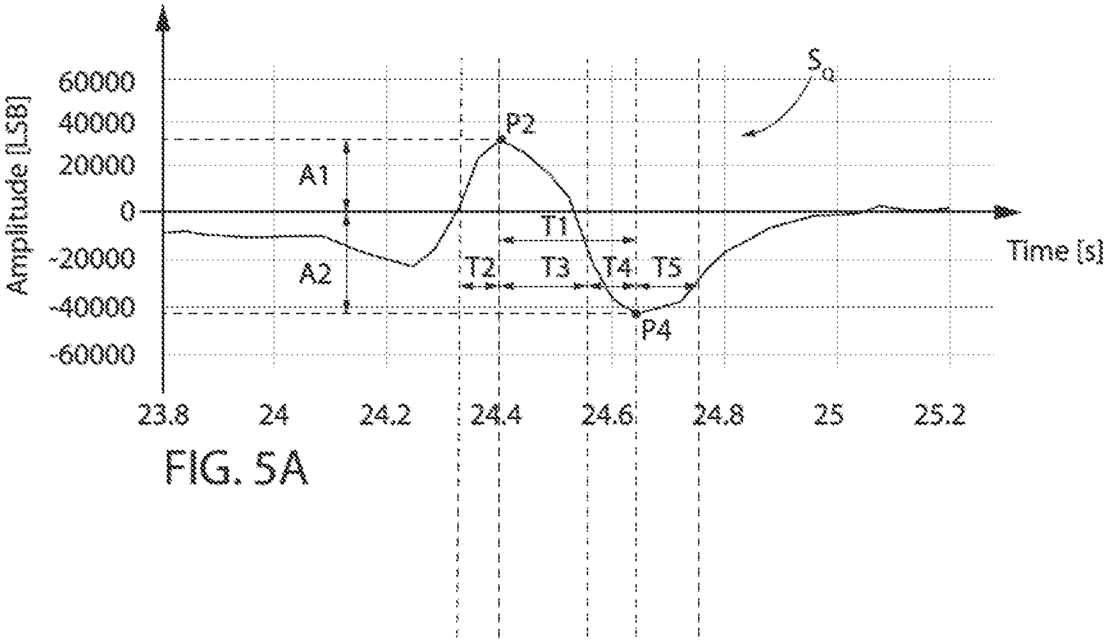
FIGS. 5A and 5B illustrate, respectively, an enlarged portion of the electrostatic charge variation signal of FIG. 4B and of the first derivative of FIG. 4C.
Figure 5B:
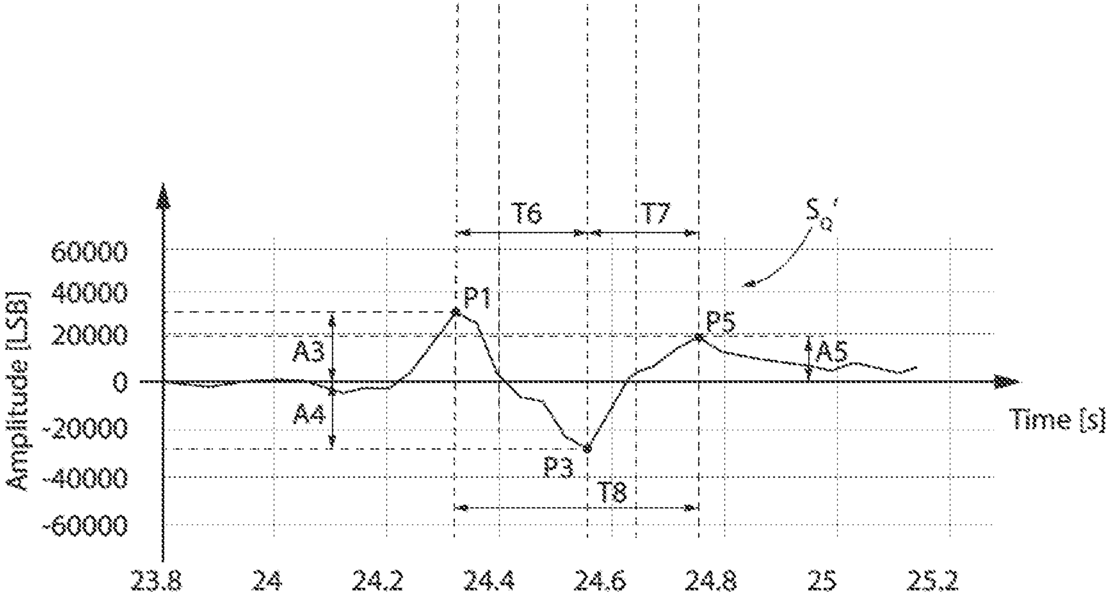

A method is now described, with reference to FIGS. 5A and 5B, for identifying significant variations in the electrostatic charge variation signal $S_Q$ and in the first derivative $S_Q'$ thereof, that is variations of such signals that may be correlated to or associated with the human presence in the monitored environment and more particularly for verifying whether the signals generated by the sensor are similar to steps executed by a human subject. The portion of the signal $S_Q$ of FIG. 5A is an enlarged portion of a part of the signal $S_Q$ of FIG. 4B, in particular the portion 18*a* delimited by a dashed line in FIG. 4B. The portion of the signal $S_Q'$ of FIG. 5B is an enlarged portion of a part of the signal $S_Q'$ of FIG. 4B, in particular the portion 18*b* delimited by a dashed line in FIG. 4B.

The signal portions of FIGS. 5A and 5B have a plurality of positive and negative peaks, which follow each other with a certain periodicity. For the purpose of the present disclosure, positive and negative peaks are identified. This operation may be performed using a peak finding algorithm of known type, for example based on the comparison with predetermined or adaptive thresholds, or other algorithms specifically provided for this purpose, as described for example with reference to FIG. 13.

With reference to FIGS. 5A and 5B, the following peaks are identified, which follow each other in temporal order (both FIGS. 5A and 5B are represented with respect to the same time axis on the abscissas). The indicated values of the time instants, as well as the amplitude values of the peaks, are purely exemplarily and are not limiting of the present disclosure.

P1: is temporally the first identified peak, here a positive peak, which occurs on the first derivative signal $S_Q'$ at about 24.3 s and has an amplitude value equal to about +30000 LSB.

P2: is temporally the second identified peak, here a positive peak, which occurs on the signal $S_Q$ at about 24.4 s and has an amplitude value equal to about +42000 LSB.

P3: is temporally the third identified peak, here a negative peak, which occurs on the first derivative signal $S_Q'$ at about 24.55 s and has an amplitude value equal to about −38000 LSB.

P4: is temporally the fourth identified peak, here a negative peak, which occurs on the signal $S_Q$ at about 24.65 s and has an amplitude value equal to about −65000 LSB.

P5: is temporally the first identified peak, here a positive peak, which occurs on the first derivative signal $S_Q'$ at about 24.75 s and has an amplitude value equal to about +18000 LSB.

As apparent to the skilled in the art, the positive peak P1 present on the signal $S_Q'$ of the first derivative identifies a rising edge of the signal $S_Q$ which culminates at the positive peak P2 of the signal $S_Q$; similarly, the negative peak P3 present on the signal $S_Q'$ of the first derivative identifies a falling edge of the signal $S_Q$ which culminates at the negative peak P4 of the signal $S_Q$; then, the signal $S_Q$ starts to grow again, and this new rising edge is identified by the positive peak P5 present on the signal $S_Q'$ of the first derivative. Therefore, the aforementioned assessment of the succession of positive and negative peaks of the signals $S_Q$ and $S_{Q'}$ has the function of identifying or detecting a specific trend of the signal generated by the electrostatic charge variation sensor 6, which the Applicant has identified as specific or significant of the presence (in particular, of the execution of a step) of a human subject in the monitored environment.

Summarizing, considering the time course of the electrostatic charge variation signal $S_Q$ and of the first derivative $S_Q'$ of the electrostatic charge variation signal $S_Q$ in conjunction, the following time succession of positive and negative peaks is observed:

1. positive peak $S_Q'$
2. positive peak $S_Q$
3. negative peak $S_Q'$
4. negative peak $S_Q$
5. positive peak $S_Q'$ However, the Applicant notes that, with a different arrangement of the electrodes E1, E2, the aforementioned time sequence (succession) may be inverted, that is the following time succession is observed:

1. positive peak $S_Q$
2. positive peak $S_Q'$
3. negative peak $S_Q$
4. negative peak $S_Q'$
5. positive peak $S_Q$ The configuration of the electrodes may in fact have an effect on the detection of an electrostatic charge variation signal. While the geometry (firstly the surface) and the materials of the electrodes determine the sensitivity of the same, their arrangement in space and their distance affects the directionality or the cancellation ability of certain unwanted signal sources. On this last point it is noted that the two electrodes E1, E2 are coupled to the differential inputs of the differential amplifier (also referred to as instrumentation amplifier) or of the analog-to-digital converter (A/D or ADC); this stage performs the difference of the signals found at the "+" and "−" inputs of the amplifier. Therefore, by suitably dimensioning and positioning the electrodes, the common mode signals, that is, those signals that occur at both inputs with the same intensity, may be cancelled (or attenuated). Based on this, embodiments of the present disclosure include configurations with a single electrode, with two electrodes being equal but spaced apart from each other, with two electrodes having different geometries, etc. If the most stressed input is the "+" one, the signal shown in the figure is found; vice versa in the case of greater stress of the input "−." In this context, the most stressed electrode is the one that detects potential variations (due to a variation of charge in the environment) that are more intense with respect to the other electrode; this may happen due to a different geometry and/or to a different installation point of the two electrodes.

The Applicant has verified that, when the above identified time succession (one of the two) is observed, it can be concluded that the signal portion 18*a* of FIG. 4B (and the first derivative 18*b* of FIG. 4C) is generated by a step of a human subject in the monitored environment.

In order to identify whether a variation of the signals $S_Q$ and $S_Q'$ is one of the peaks sought, respective thresholds (positive or negative) $A1_{TH}$-$A5_{TH}$ are provided, to be compared with the trend of the signals $S_Q$ and $S_Q'$.

The thresholds $A1_{TH}$-$A5_{TH}$ have a predefined/default value, identified empirically on the basis of observations of the trend of the signals $S_Q$ and SQ', and for example are defined as follows:

- threshold $A1_{TH}$: chosen as a fraction (e.g., between ½ and ⅙) of the maximum value reachable (or known to be such on the basis of experiments) by the first peak P1; by way of example, in this embodiment described it has a value chosen in the range 8000-12000 LSB (value expressed in modulus), in particular 10000 LSB.
- threshold $A2_{TH}$: chosen as a fraction (e.g., between ½ and ⅙) of the maximum value reachable (or assumed to be such on the basis of experiments) by the second peak P2; by way of example, in this embodiment described it has a value chosen in the range 8000-12000 LSB (value expressed in modulus), in particular 10000 LSB.
- threshold $A3_{TH}$: chosen as a fraction (e.g., between ½ and ⅙) of the maximum value reachable (or assumed to be such on the basis of experiments) by the third peak P3; by way of example, in this embodiment described it has a value chosen in the range 6000-8500 LSB (value expressed in modulus), here in particular 7500 LSB.
- threshold $A4_{TH}$: chosen as a fraction (e.g., between ½ and ⅙) of the maximum value reachable (or assumed to be such on the basis of experiments) by the fourth peak P4; by way of example, in this embodiment described it has a value chosen in the range 6000-8500 LSB (value expressed in modulus), here in particular 7500 LSB.
- threshold $A5_{TH}$: chosen as a fraction (e.g., between ½ and ⅕) of the maximum value reachable (or assumed to be such on the basis of experiments) by the fifth peak P5;

by way of example, in this embodiment described it has a value chosen in the range 6000-8500 LSB (value expressed in modulus), in particular 7500 LSB.

In the example of FIGS. 5A and 5B, the thresholds have the following value: threshold $A1_{TH}$: +10000 LSB; threshold $A2_{TH}$: +10000 LSB; threshold $A3_{TH}$: −7500 LSB; threshold $A4_{TH}$: −7500 LSB; threshold $A5_{TH}$: +7500 LSB.

Alternatively to what has been described, the value of the thresholds $A1_{TH}$-$A5_{TH}$ may be chosen as a function of the background noise of the respective signals $S_Q$ and $S_Q$', for example equal to 8-12 times (e.g., 10 times) the average value of the noise.

The following comparisons are then performed for each threshold:

the amplitude A1, in LSB, of the peak P1, exceeds, in positive, the threshold $A1_{TH}$ for P1 to be identified as a "positive peak";

the amplitude A2, in LSB, of the peak P2, exceeds, in positive, the threshold $A2_{TH}$ for P2 to be identified as a "positive peak";

the amplitude A3, in LSB, of the peak P3, exceeds, in negative, the threshold $A3_{TH}$ for P3 to be identified as a "negative peak";

the amplitude A4, in LSB, of the peak P4, exceeds, in negative, the threshold $A4_{TH}$ for P4 to be identified as a "negative peak"; and the amplitude A5, in LSB, of the peak P5, exceeds, in positive, the threshold $A5_{TH}$ for P5 to be identified as a "positive peak."

To improve the robustness of the method proposed herein, by improving the discrimination between actual step and environmental noise or other perturbation, it is possible, again with reference to FIGS. 5A and 5B, to define and monitor the following additional parameters:

T1: time interval between the positive peak P2 and the negative peak P4 of the electrostatic charge variation signal $S_Q$.

T2: time interval between the positive peak P2 of the electrostatic charge variation signal $S_Q$ and the positive peak P1 of the first derivative signal $S_Q$'.

T3: time interval between the positive peak P2 of the electrostatic charge variation signal $S_Q$ and the negative peak P3 of the first derivative signal $S_Q$'.

T4: time interval between the negative peak P4 of the electrostatic charge variation signal $S_Q$ and the negative peak P3 of the first derivative signal $S_Q$'.

T5: time interval between the negative peak P4 of the electrostatic charge variation signal $S_Q$ and the positive peak P5 of the first derivative signal $S_Q$'.

T6: time interval between the positive peak P1 and the negative peak P3 of the first derivative signal $S_Q$'.

T7: time interval between the negative peak P3 and the positive peak P5 of the first derivative signal $S_Q$'.

T8: time interval between the positive peak P1 and the positive peak P5 of the first derivative signal $S_Q$'.

The existence of the following relationships is verified:

$$T1=T3+T4$$

$$T6=T2+T3$$

$$T7=T4+T5$$

$$T8=T6+T7$$

Additionally, or alternatively, the existence of the following relationships is verified, to verify that the duration of the time intervals T2-T5 complies with that expected for the signal shape that may be associated with a step of a subject:

$T2_{TH\_L}<T2<T2_{TH\_H}$, where $T2_{TH\_L}$ and $T2_{TH\_H}$ represent the boundaries of a range of time values within which T2 needs to be comprised (e.g., $T2_{TH\_L}$=30-70 ms and $T2_{TH\_H}$=150-250 ms);

$T3_{TH\_L}<T3<T3_{TH\_H}$, where $T3_{TH\_L}$ and $T3_{TH\_H}$ represent the boundaries of a range of time values within which T3 needs to be comprised (e.g., $T3_{TH\_L}$=30-70 ms and $T3_{TH\_H}$=150-250 ms);

$T4_{TH\_L}<T4<T4_{TH\_H}$, where $T4_{TH\_L}$ and $T4_{TH\_H}$ represent the boundaries of a range of time values within which T4 needs to be comprised (e.g., $T4_{TH\_L}$=30-70 ms and $T4_{TH\_H}$=150-250 ms); and $T5_{TH\_L}<T5<T5_{TH\_H}$, where $T5_{TH\_L}$ and $T5_{TH\_H}$ represent the boundaries of a range of time values within which T5 needs to be comprised (e.g., $T5_{TH\_L}$=30-70 ms and $T5_{TH\_H}$=150-250 ms).

In one embodiment, the values of $T1_{TH\_L}$-$T5_{TH\_L}$ are equal to each other and equal to 50 ms; and the values of $T1_{TH\_H}$-$T5_{TH\_H}$ are equal to each other and equal to 200 ms.

The choice of the values of $T1_{TH\_H}$-$T5_{TH\_H}$ may vary with respect to what is described herein and set on an empirical basis after experimental observations.

Figure 6:
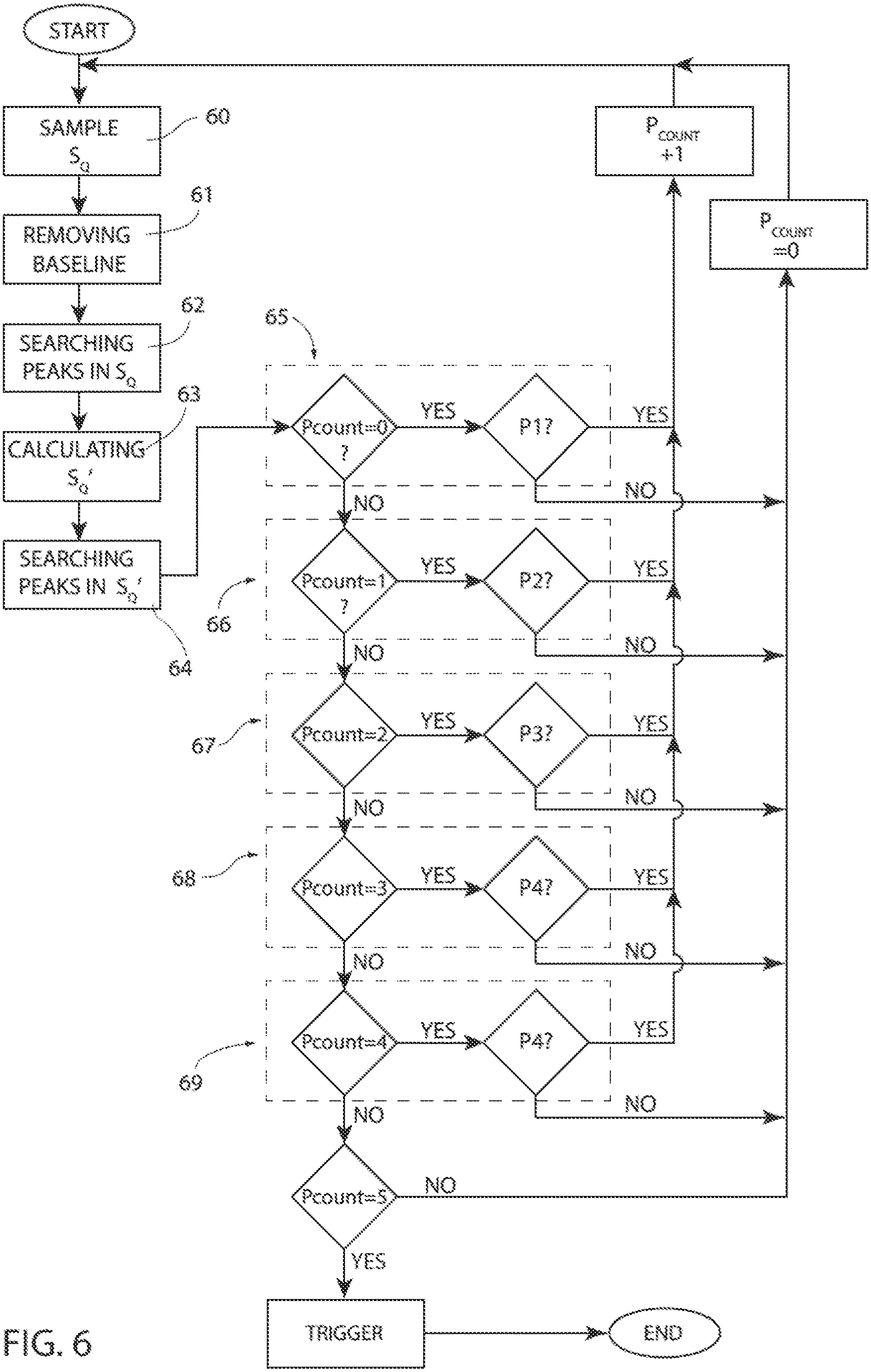
FIG. 6 illustrates, through a flow chart, a method for detecting the human presence implemented by the system of FIG. 1, with exclusive reference to the electrostatic charge variation signal.

FIG. 6 illustrates, through a flow diagram, the method for detecting the human presence implemented by the system 1 of FIG. 1, with exclusive reference to the electrostatic charge variation signal $S_Q$, according to what has been previously described.

At step 60 the processing unit 2 acquires the raw signal $S_Q$ from the electrostatic charge variation sensor 6.

At step 61 the raw signal $S_Q$ is processed to remove the baseline or background signal, as previously mentioned.

At step 62 the method for searching the positive/negative peaks on the electrostatic charge variation signal $S_Q$ is performed, identifying for example the time succession of the peaks P2 and P4 of FIG. 5A.

At step 63 the first derivative signal $S_Q$' of the electrostatic charge variation signal $S_Q$ is calculated.

Then, at step 64 the method for searching positive/negative peaks on the first derivative signal $S_Q$' is performed, identifying for example the time succession of the peaks P1, P3 and P5 of FIG. 5B.

The aforementioned conditions are then assessed on the amplitude A1-A5 of the detected peaks and on the time intervals T2-T5. The method proposed herein is performed in real time, that is by acquiring the samples of the raw signal $S_Q$ and assessing the conditions previously described as these samples are generated by the electrostatic charge variation sensor 6.

A counter $P_{COUNT}$ (initialized for example to zero) stores the number of identified peaks (five peaks P1-P5 may be utilized and, in some embodiments, may be required to confirm the identification of a step in this embodiment). At an initial instant where no peaks have yet been detected, $P_{COUNT}$=0.

With reference to blocks 65-69 of FIG. 6, the value of the counter $P_{COUNT}$ is assessed. The increase in the value of $P_{COUNT}$ determines the access to the respective computational blocks 65-69, to verify the respective conditions on the peaks P1-P5 which, as previously illustrated, differ from each other in terms of amplitude thresholds and time references.

At block 65 the presence of the peak P1 in the first derivative signal $S_Q$' is assessed by comparing the amplitude value A1 with the respective threshold $A1_{TH}$. If the comparison with the threshold determines the presence of the peak P1, then the counter $P_{COUNT}$ is updated ($P_{COUNT}=1$) and a new datum is acquired from the raw signal $S_Q$. Otherwise, the counter $P_{COUNT}$ is reset to a zero value and a new datum is acquired from the raw signal $S_Q$.

Steps 60-64 are then performed again.

If the presence of the peak P1 has been confirmed, the assessment of the value of the counter $P_{COUNT}$ determines passing from step 64 to step 66, wherein the presence of the peak P2 in the electrostatic charge variation signal $S_Q$ is assessed by comparing the amplitude value A2 with the respective threshold $A2_{TH}$. If the comparison with the threshold determines the presence of the peak P2, and the time conditions on the value of the interval T2 are met, such that $T2_{TH\_L}<T2<T2_{TH\_H}$, then the counter $P_{COUNT}$ is updated ($P_{COUNT}=2$) and a new datum is acquired from the raw signal $S_Q$. Otherwise, the counter $P_{COUNT}$ is reset to a zero value and a new datum is acquired from the raw signal $S_Q$.

Steps 60-64 are then performed again.

If the presence of the peak P2 has been confirmed, the assessment of the value of the counter PCOUNT determines passing from step 64 to step 67, wherein the presence of the peak P3 in the first derivative signal $S_Q'$ is assessed by comparing the amplitude value A3 with the respective threshold $A3_{TH}$. If the comparison with the threshold determines the presence of the peak P3, and the time conditions on the value of the interval T3 are met, such that $T3_{TH\_L}<T3<T3_{TH\_H}$, then the counter $P_{COUNT}$ is updated ($P_{COUNT}=3$) and a new datum is acquired from the raw signal $S_Q$. Otherwise, the counter PCOUNT is reset to a zero value and a new datum is acquired from the raw signal $S_Q$.

Steps 60-64 are then performed again.

If the presence of the peak P3 has been confirmed, the assessment of the value of the counter $P_{COUNT}$ determines passing from step 64 to step 68, wherein the presence of the peak P4 in the electrostatic charge variation signal $S_Q$ is assessed by comparing the amplitude value A4 with the respective threshold $A4_{TH}$. If the comparison with the threshold determines the presence of the peak P4, and the time conditions on the value of the interval T4 are met, such that $T4_{TH\_L}<T4<T4_{TH\_H}$, then the counter $P_{COUNT}$ is updated ($P_{COUNT}=4$) and a new datum is acquired from the raw signal $S_Q$. Otherwise, the counter $P_{COUNT}$ is reset to a zero value and a new datum is acquired from the raw signal $S_Q$.

Steps 60-64 are then performed again.

If the presence of the peak P4 has been confirmed, the assessment of the value of the counter $P_{COUNT}$ determines passing from step 64 to step 69, wherein the presence of the peak P5 in the first derivative signal $S_Q'$ is assessed by comparing the amplitude value A5 with the respective threshold $A5_{TH}$. If the comparison with the threshold determines the presence of the peak P5, and the time conditions on the value of the interval T5 are met, such that $T5_{TH\_L}<T5<T5_{TH\_H}$, then the analysis of the relative portion 18*a*, 18*b* of the signals $S_Q$ and $S_Q'$ is concluded and a warning, or trigger signal, may be generated, which confirms the identification of a step in the signal generated by the electrostatic charge variation sensor 6.

The counter $P_{COUNT}$ is reset and a new datum is acquired from the raw signal $S_Q$, to identify the presence of a successive step.

The confirmation of human presence in the environment occurs, according to an aspect of the present disclosure, after the identification of a plurality of steps, for example of five steps. However, it is apparent that, in order to speed up the detection, it is possible to report the presence of the subject even only after the identification of a single step.

As previously mentioned, to generate the actual alarm or final confirmation of the human presence, the present disclosure provides for the joint analysis of the signals $S_P$, $S_A$ generated by the pressure sensor 4 and by the vibration sensor 7.

Figure 7:
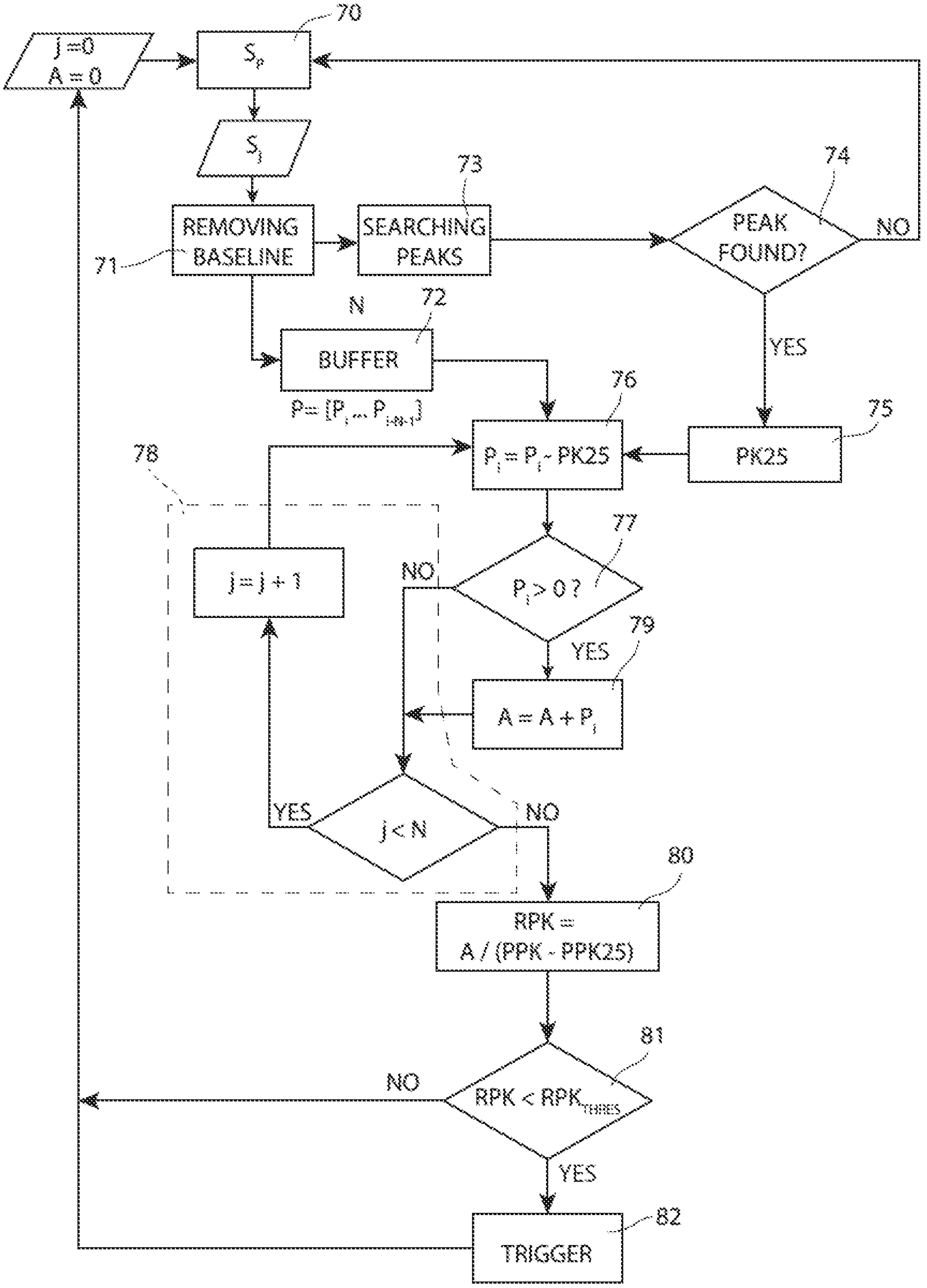
FIG. 7 illustrates, through a block diagram, steps of a method for analyzing the pressure signal of FIG. 3C or 4A, in order to extract or identify significant characteristics for detecting the human presence.

FIG. 7 illustrates, through a block diagram, steps of a method for analyzing the pressure signal $S_P$.

In one embodiment, the algorithm of FIG. 7 operates in real time, similarly to the method of FIG. 6, that is the data is processed during the same acquisition step. It is assumed that the pressure signal has been converted into digital and therefore, hereinafter, the term "datum" identifies a digital value of the pressure signal $S_P$ (e.g., pressure value in mbar).

At each iteration, after the acquisition of the pressure signal $S_P$ (step 70), the i-th pressure datum Pi (amplitude value) is deducted of its baseline (step 71) and is stored in a buffer $P_{BUFF}$ (step 72); at the same time, or at previous or subsequent time instants, indifferently, the search for possible peaks in the pressure signal $S_P$ (step 73) is carried out, using algorithms known for this purpose, or specifically provided for this purpose. If a peak is detected (step 74, output YES), the value PK25 equal to 25% of the amplitude of the detected peak is calculated (step 75) (this percentage value is indicative and may vary for example in the range 10%-50%). Iteratively, this value PK25 is subtracted (step 76) to each pressure datum (i-th datum $PK_i$) contained in the buffer $P_{BUFF}$ (operation $PK_i$-PK25). If the value resulting from this subtraction is positive (step 77, output YES), then this value is added to a variable $P_{AREA}$ (representative of the area of the plane portion, between the peak and 25% of its value), to perform a calculation, in digital form, of the integral of the signal around the detected peak (step 79). The integral may be calculated as an area (variable A in step 79) subtended by the signal relating to the peak, that is in digital format by adding the amplitude values $P_i$-PK25, only if this difference is greater than 0. At step 76 the value PK25 is in fact subtracted to each sample Pi; if the result of this operation of step 76 is positive, then this result is added to the previous area value A (where A is initialized to 0 at the beginning of the method); if the result of step 76 is negative, this result is ignored. This operation of addition is carried out for a maximum of N iterations; the count of these N iterations is carried out by increasing an index j, regardless of the value of the result of the operation of step 76 (the increase of j allows to go through the entire buffer 72).

The steps 76,77,78,79 have the function of quantifying the portion of the area subtended by the curve only in the presence of a peak, so as to be capable of performing the operation, of the successive step 80, of assessing the peak itself.

Finally, the ratio $R_{PK}$ between $P_{AREA}$ and $PK_i$-PK25 is calculated (step 80) (obtaining a result which is greater than 1), which is indicative of the "steepness" of the peak: the smaller the value of this ratio $R_{PK}$, the greater the steepness and vice versa. The value of the ratio $R_{PK}$ is compared with a threshold $RP_{THRES}$ (step 81): if $R_{PK}<R_{PTHRES}$ then the peak is sufficiently steep to be similar to that generated by the opening of a door, and a signal, or trigger, indicative of this event is generated (step 82); vice versa, the method returns to step 70 by resetting the variables j and A. The choice of the threshold $RP_{THRES}$ includes, for example, values comprised between 10 and 30; the smaller this value, the steeper and more time-limited the detected peak.

Figure 8A:
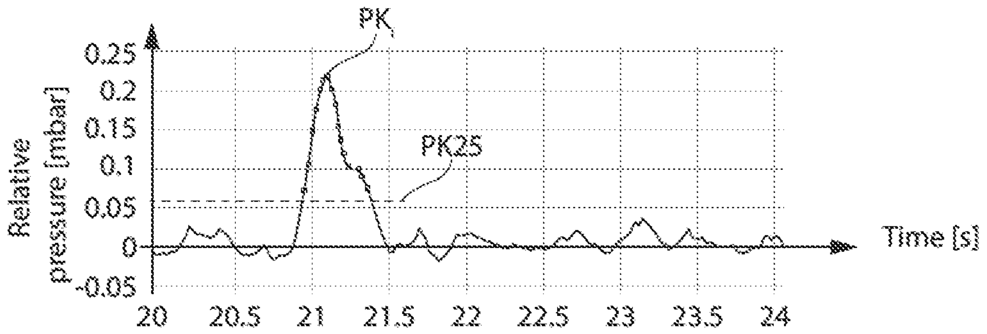
FIGS. 8A-8C graphically show steps for processing the pressure signal according to the method of FIG. 7.

For greater clarity of the operation of the method of FIG. 7, FIG. 8A illustrates a pressure signal Sp having the threshold PK25 and a peak PKi graphically shown thereon. Here, the peak PKi has an amplitude value equal to 0.215 mbar and therefore the threshold is PK25=0.054 mbar.

Figure 8B:
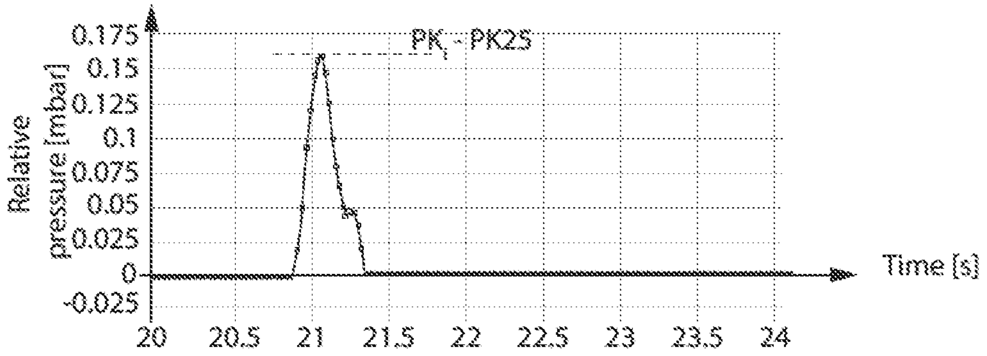

FIG. 8B illustrates the signal of FIG. 8A after step 76, wherein the operation of subtracting the value PK25 from each datum of the signal $S_P$ is performed. After this operation, the value of the peak Pki is equal to 0.16 mbar, the value of the ratio $R_{PK}$ is equal to 9.44, the value of the area $P_{AREA}$ is equal to 1.51, and the threshold $RP_{THRES}$ is set to 15. The assessment of step 81 gives therefore a positive result, as $R_{PK}<RP_{THRES}$.

Figure 8C:
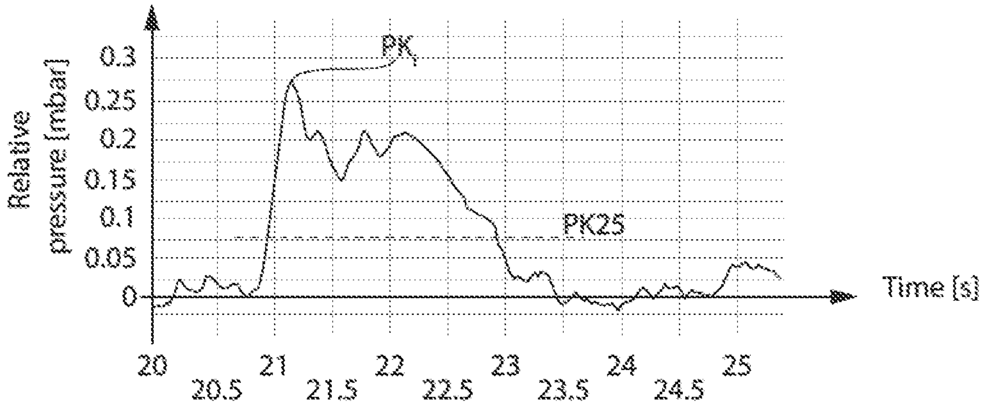

FIG. 8C illustrates a signal wherein the door opening event is not confirmed/recognized, since $R_{PK}>RP_{THRES}$. In this example, after the operation of step 76, the amplitude of the peak PKi is equal to 0.22, the value PK25 is 0.072, the value of the area $P_{AREA}$ is 8.56, the ratio $R_{PK}$ is equal to 38.9 and the threshold $RP_{THRES}$ is set to 15.

Figure 9:
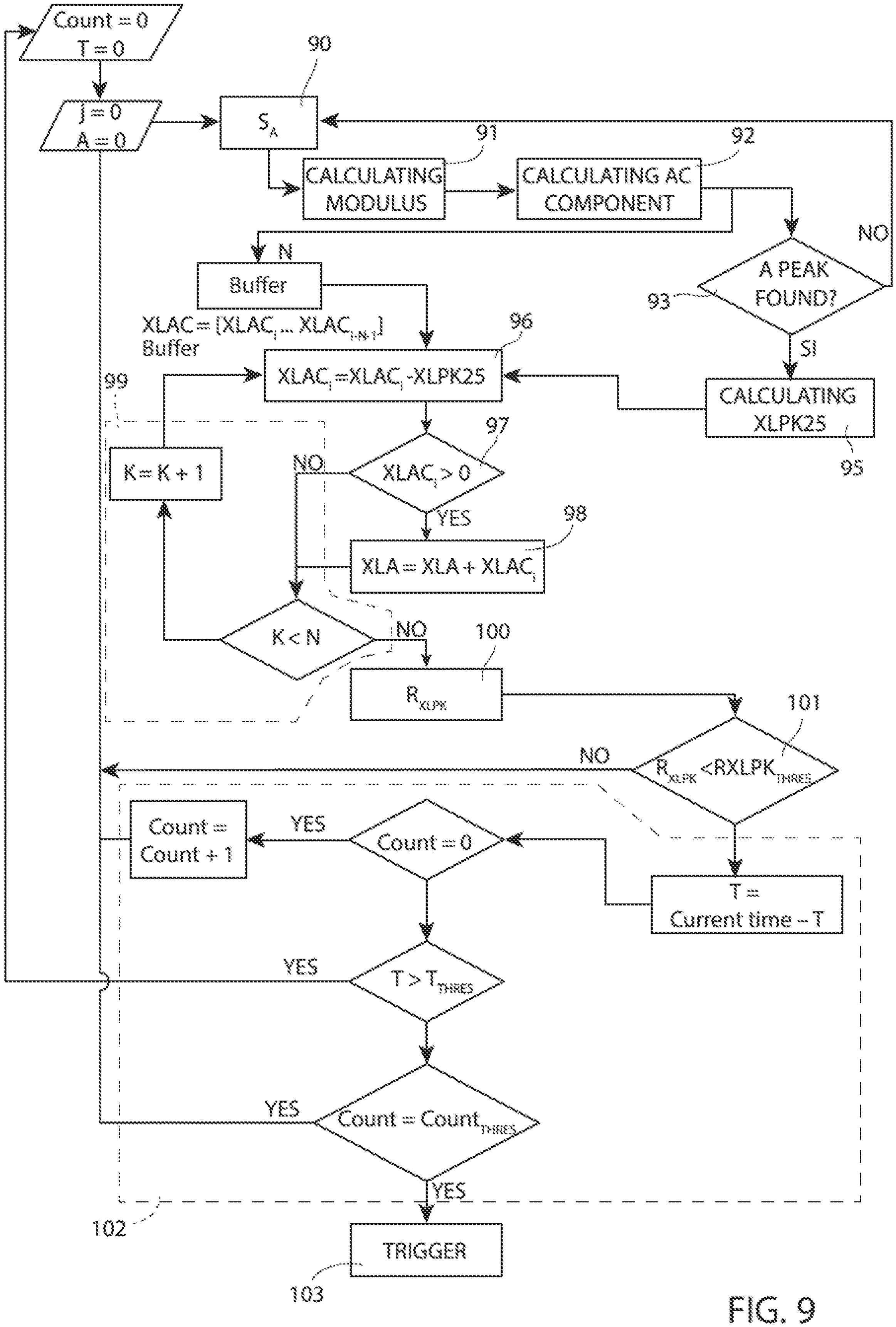
FIG. 9 illustrates, through a block diagram, steps of a method for analyzing the vibration signal of FIG. 3C, in order to extract or identify significant characteristics for detecting the human presence.

FIG. 9 illustrates, through a block diagram, steps of a method for analyzing the vibration signal $S_A$.

In one embodiment, the algorithm of FIG. 9 operates in real time, similarly to the method of FIG. 6 or FIG. 7, that is the data is processed during the same acquisition step. It is assumed that the vibration signal has been converted into digital and therefore, hereinafter, the term “datum” identifies a digital value of the vibration signal $S_A$ (e.g., signal amplitude in LSB).

At each iteration, after having acquired the vibration signal relating to the detection axes of the accelerometer ($S_{Ax}$, $S_{Ay}$, $S_{Az}$) by the processing unit 2 (step 90), the modulus XLM (i.e., the signal $S_A$ previously discussed) of the acceleration is calculated (step 91) on the basis of the signals acquired from the three axes of the accelerometer (assuming here to use a triaxial accelerometer).

The AC component is then obtained (step 92) (i.e., amount correlated to the variation of the signal with respect to the average value of this signal, whose i-th value is indicated as XLPKi), which is stored in a buffer $XLAC_{BUFFER}$; at the same time the search for possible signal peaks is carried out on such data (step 93). If a peak is detected (step 93, output YES), the value XLPK25 (step 95) is calculated equal to 25% of the peak amplitude (this percentage value may be chosen differently, for example in the range 10%-50%). Otherwise, the method returns to step 90.

Iteratively, this value XLPK25 is subtracted to all the values XLPKi contained in the buffer $XLAC_{BUFFER}$ (step 96). If, for each sample, the value resulting from this subtraction is positive, then (step 97, output YES) this value is added to the variable XLA (representative of the area of the plane portion, between the peak and 25% of its value), implementing an operation of calculation of the integral in digital format (step 98).

If the result of the foregoing step is negative, this result is ignored. This operation of adding and updating the variable XLA is carried out for a maximum of N iterations; the count of these N iterations is carried out by increasing an index k, regardless of the result of the assessment of step 97 (the increase of k allows to go through the entire buffer $XLAC_{BUFFER}$)

The ratio $R_{XLPK}$ between the area $A_{XL}$ and XLPKi-XLPK25 (greater than 1), indicative of the steepness of the peak, is then calculated (step 100), for each i-th datum: the smaller the value of this ratio, the greater the steepness of rising of the signal, and vice versa.

$R_{XLPK}$ is compared (step 101) with a threshold $RXLPK_{THRES}$: if $R_{XLPK}<RXLPK_{THRES}$ then the identified peak is steep and similar to that generated by a subject’s step (step 103) and a suitable signal, or trigger, is generated which confirms the presence of the subject in the considered environment.

In order to increase the reliability of the proposed method, so that the vibration signal is validated as generated by a subject’s steps, it is optionally possible to verify (step 102) the repetition of a certain number of peaks over time (e.g., by setting a comparison threshold CountTHRES, for example equal to 2), with the condition that a time which is longer than a predefined value $T_{THRES}$ (for the choice of this value, considerations similar to those previously made for the pressure signal Sp are valid) does not elapse between an event of single step and the successive.

Figure 10A:
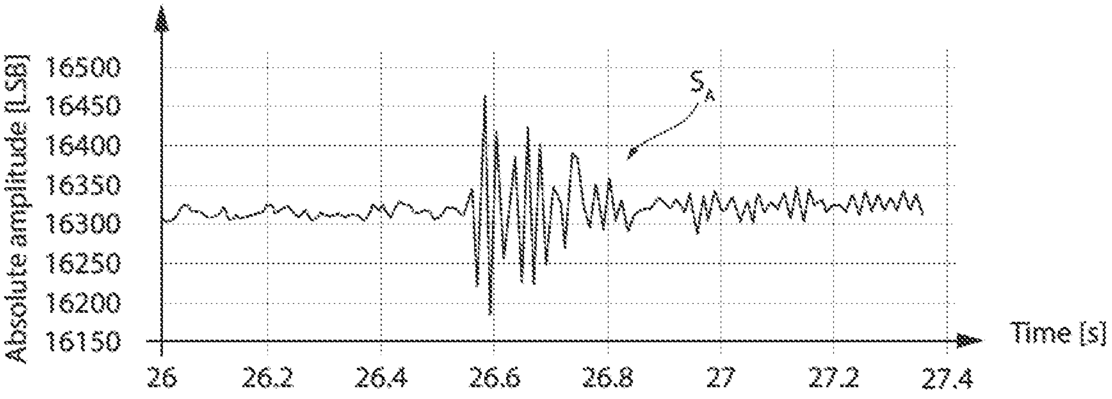
FIGS. 10A-10C graphically show steps for processing the vibration signal according to the method of FIG. 9.

For improved clarity of the operation of the method of FIG. 9, FIG. 10A illustrates a vibration signal $S_A$ obtained by calculating the modulus of the three detection components of a triaxial accelerometer. The signal of FIG. 10A is temporally limited to the signal detected during the execution of a single step.

Figure 10B:
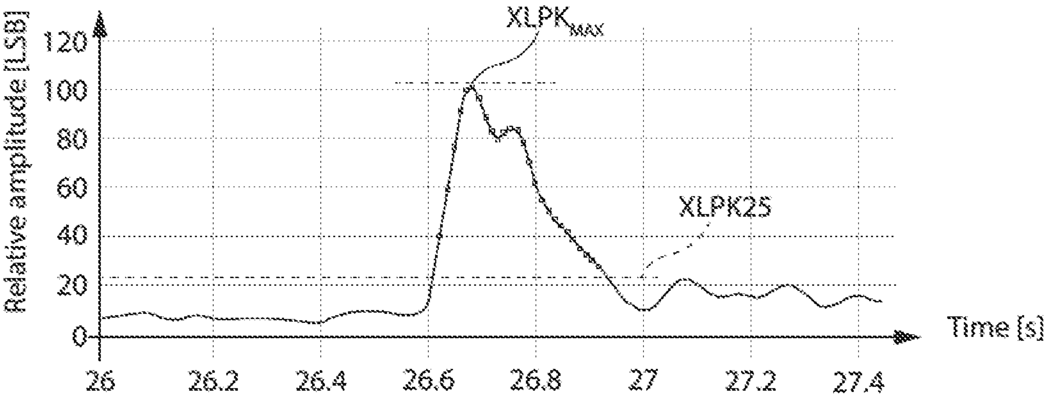

FIG. 10B illustrates the AC component of the signal of FIG. 10A (which actually represents the envelope of the signal of FIG. 10A). The maximum value $XLPK_{MAX}$ of peak amplitude, here equal to 101.9 LSB, and the calculated value of XLPK25=25.5 LSB are indicated on the signal of FIG. 10B.

Figure 10C:
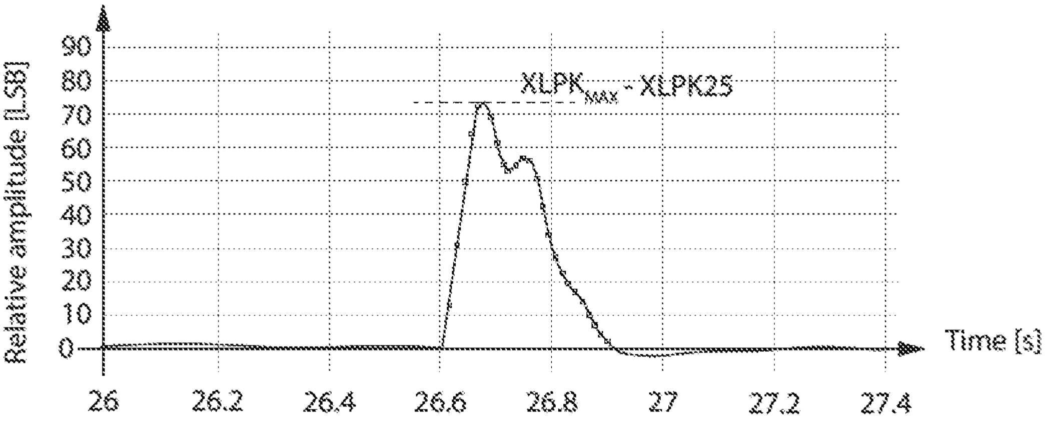

FIG. 10C illustrates the signal resulting from the operation XLPKi−XLPK25 (performed for each i-th sample of the signal $S_A$, wherein the value of the peak of FIG. 10B is now equal to 76.4, the value of the area $A_{XL}$, is equal to 517.9, the value of the ratio $R_{XLPK}$ is equal to 6.78 and the threshold $RXLPK_{THRES}$ is set to the value 15. The assessment $R_{XLPK}<RXLPK_{THRES}$ therefore gives a positive result, as $R_{XLPK}<RXLPK_{THRES}$.

Figure 11:
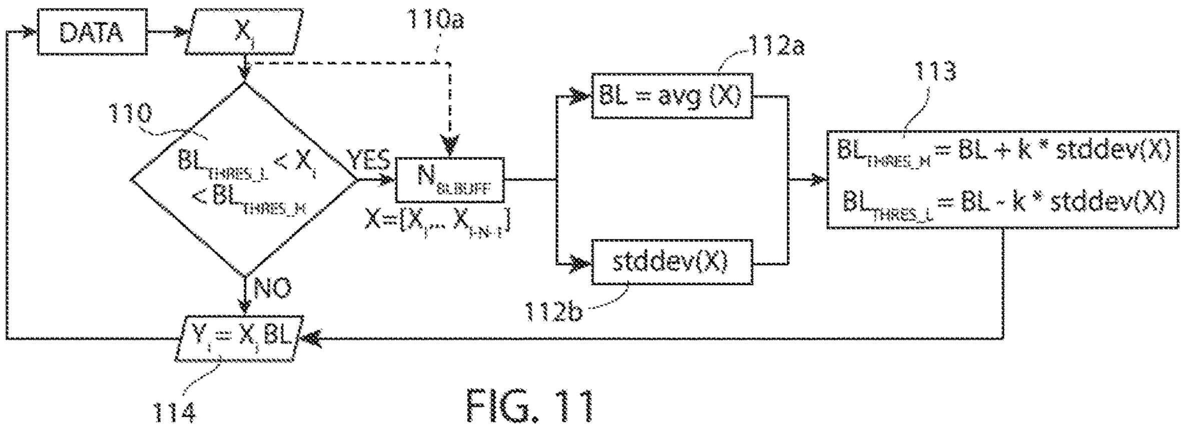
FIGS. 11 and 12 show, through a block diagram, respective methods for removing the baseline, applicable in the context of the present disclosure to generate the signals of FIGS. 4A and 4B.
Figure 12:
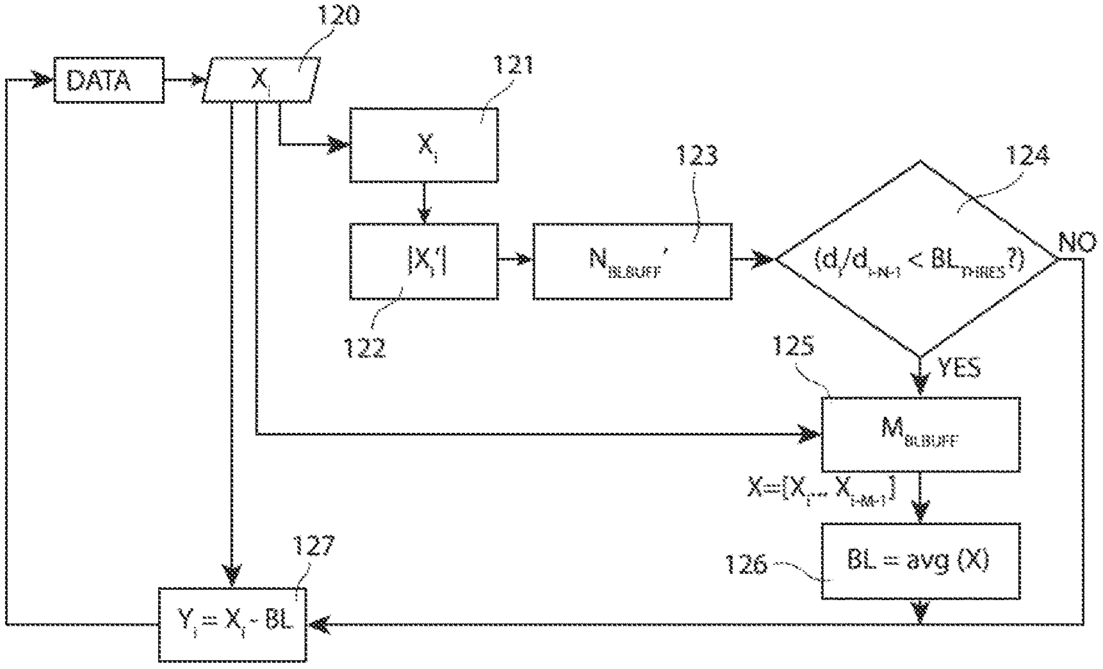

With reference to FIGS. 11 and 12, respective methods for the removal of the baseline, applicable in the context of the present disclosure, are now described.

With reference to FIG. 11, the algorithm operates in real time, similarly to the method of FIG. 6 or FIG. 7, that is the data is processed during the same acquisition step. It is assumed that the signal received at the input (which may be any of the modulus of the vibration signal $S_A$, the pressure signal $S_P$ and the electrostatic charge variation signal $S_Q$) has been converted into digital and therefore, hereinafter, the term “datum” identifies a sample or digital value of the considered signal (e.g., signal amplitude in LSB or pressure value in mbar).

At each iteration, the following operations are performed.

If the input datum xi (i-th datum) is comprised between the thresholds $BL_{THRES\_H}$ and $BL_{THRES\_L}$ (step 110, output YES) the datum xi is accumulated (step 111) in a shift buffer having size $N_{BLBUFF}$ (e.g., $N_{BLBUFF}$=10).

In the early iteration steps (first start of the algorithm), the thresholds $BL_{THRES\_H}$ and $BL_{THRES\_L}$ are ignored (i.e., the output from block 110 is “YES”), until the buffer is completely filled (a number of iterations equal to $N_{BLBUFF}$ are utilized and in some embodiments may be required). In other words, all the incoming samples xi will fill the buffer, as identified by the arrow 110*a* in dashed line.

A variable BL that stores the current baseline value is then updated with a value equal to the average value of the samples present in the buffer (step 112*a*) at the same time, the standard deviation value of the samples present in the buffer is calculated (step 112*b*). New thresholds $BL_{THRES\_H}$ and $BL_{THRES\_L}$ are calculated (step 113), respectively equal to the value of the variable BL increased and decreased by a multiple amount of the standard deviation of the samples present in the buffer. The parameter k adjusts the width of the band defined by the two thresholds $BL_{THRES\_H}$ and $BL_{THRES\_L}$: the greater the value of k, the greater the variations of the input datum that will be absorbed in the baseline. The variable k is chosen, for example, in the range 3-6.

After calculating, for each input sample xi, the respective baseline value BL, the output datum yi=xi=BL is generated (step 114), that is the datum that will form the respective vibration $S_A$, pressure $S_P$ or electrostatic charge signal $S_Q$ deprived of the respective baseline.

If the input datum is not comprised between the thresholds $BL_{THRES\_H}$ and $BL_{THRES\_L}$ (step 110, output NO), the baseline and the thresholds are not modified. The output datum yi is, in any case, equal to the input value xi deducted of the value BL calculated as the average of the samples present in the buffer. It is repeated that the operations of steps 112*a*, 112*b* are not performed until the buffer is completely filled.

FIG. 12 illustrates a further method, alternative to that of FIG. 11, for calculating the baseline and subtracting the same from the respective signal.

The algorithm operates in real time, similarly to the method of FIG. 11, that is the data is processed during the same acquisition step. It is assumed that the signal received at the input (which may be any of the modulus of the vibration signal $S_A$, the pressure signal $S_P$ and the electrostatic charge variation signal $S_Q$) has been converted into digital and therefore, hereinafter, the term "datum" identifies a sample or digital value of the considered signal (e.g., signal amplitude in LSB or pressure value in mbar).

At each i-th iteration, the i-th datum xi of the respective signal is acquired by the processing unit 2 (step 120). Then, the first derivative xi' is calculated (step 121). Then, the absolute value |xi'| of the first derivative xi' is calculated (step 122). The absolute value |xi'| which is calculated is then entered into a buffer (step 123) having size $N_{BLBUFF}$' (for example equal to 10).

If (step 124) all the values contained in the buffer are lower than a threshold $BL_{THRES}$ then (output YES from step 124) the input data xi is entered into a second buffer with size $M_{BLBUFF}$ (step 125). Being a derivative, exceeding the threshold $BL_{THRES}$ is indicative of the rate at which the signal increases (or decreases). This value depends on the type of quantity analyzed, on the data rate and on the "noisiness" of the environment and of the sensor itself. For example, in the case of the charge variation signal, the threshold $BL_{THRES}$ may be comprised between 8000 and 16000.

The baseline BL is then updated to the new value, given by the average of the elements present in this second buffer (step 126).

After calculating, for each input sample xi, the respective baseline value BL, the output datum yi=xi−BL is generated (step 127), that is the datum that will form the respective vibration $S_A$, pressure Sp or electrostatic charge signal $S_Q$ deprived of the respective baseline.

If at least one element of the first buffer exceeds or is equal to the threshold $BL_{THRES}$, the baseline variable BL is not updated (output NO from step 124).

The output value yi is, however, equal to the input value xi deducted of the value BL.

At the first start, the algorithm ignores the check of the threshold $BL_{THRES}$ for a number of iterations sufficient to completely fill the first buffer of size $N_{BLBUFF}$' In this starting condition, all the input samples |xi'| are used to fill this first buffer and the generation of an output datum yi is not performed.

Figure 13:
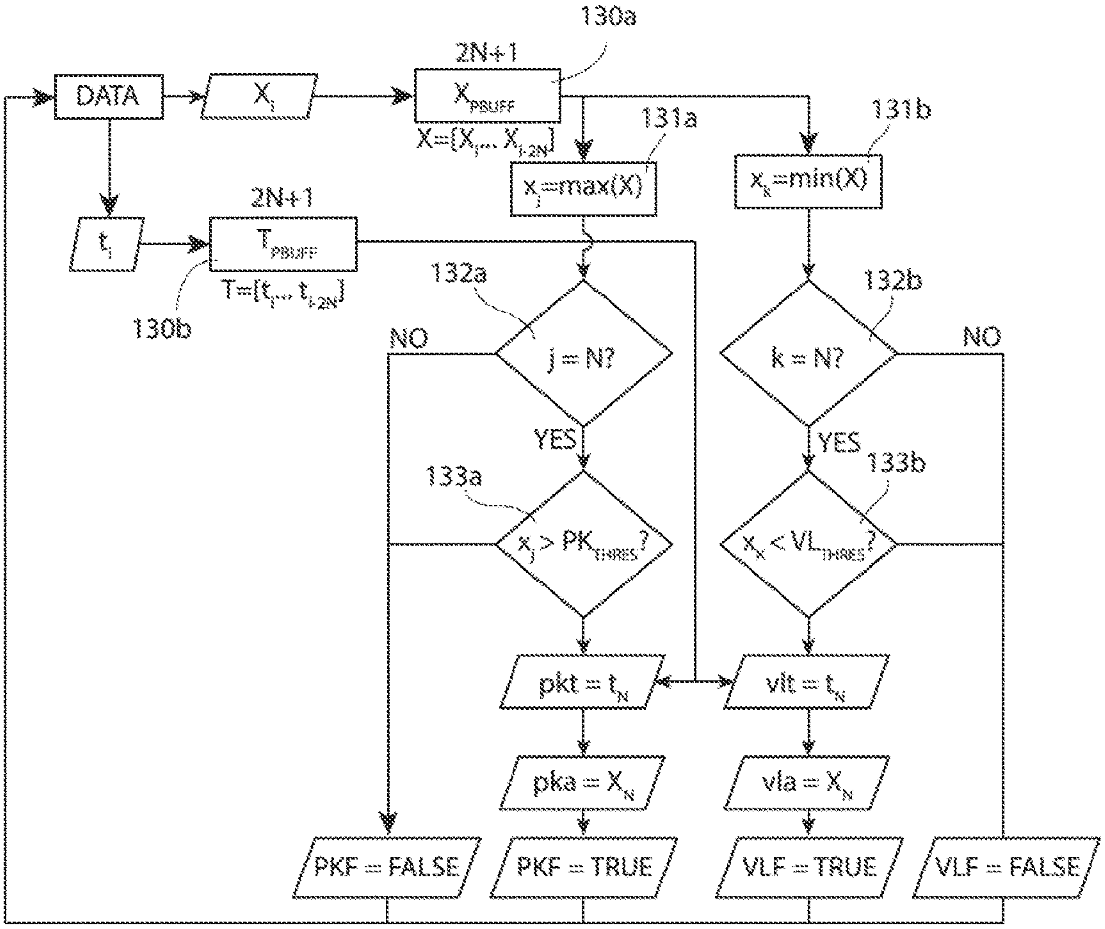
FIG. 13 illustrates, through a block diagram, steps of a method for detecting peaks usable in the context of the present disclosure to recognize positive and negative peaks, applicable in the context of the methods of FIGS. 6 and 7.

FIG. 13 illustrates, through a block diagram, steps of a peak finding method, usable in the context of the present disclosure to recognize positive and negative peaks, for example applicable in the context of steps 62 and 73 previously described with reference to FIGS. 6 and 7, respectively.

With reference to FIG. 13, the algorithm operates in real time, similarly to the method of FIG. 6 or FIG. 7, that is the data is processed during the same acquisition step. It is assumed that the signal received at the input (which may be any of the modulus of the vibration signal $S_A$, the pressure signal Sp and the electrostatic charge variation signal $S_Q$) has been converted into digital and therefore, hereinafter, the term "datum" identifies a sample or digital value, or sample, of the considered signal (e.g., signal amplitude in LSB or pressure value in mbar).

With reference to the algorithm of FIG. 13, the following variables are defined and used:

xi=amplitude in LSB or pressure value in mbar of the current datum (sample) (i-th datum);

ti=time instant associated with the current datum xi;

2N+1=width, expressed in number of samples, of a considered peak (comprehensive of the signal portion rising towards a maximum peak value, the maximum value reached, and the signal portion falling from the maximum value);

$PK_{THRES}$=comparison threshold to detect the presence of a positive peak;

$VL_{THRES}$=comparison threshold to detect the presence of a negative peak;

xj=local maximum reached by the positive peak;

xk=local minimum reached by the negative peak;

pka=amplitude in LSB or pressure value in mbar of the local maximum reached by the considered positive peak;

pkt=time instant associated with the local maximum pka reached by the considered positive peak;

vla=amplitude in LSB or pressure value in mbar of the local minimum reached by the considered negative peak;

vlt=time instant associated with the local minimum vla reached by the considered negative peak;

PKF=variable, or "flag," which identifies the "positive-peak-found" event;

VLF=variable, or "flag," which identifies the "negative-peak-found" event. At each iteration, the amplitude and the time index of the input datum are entered (steps 130*a* and 130*b*), respectively, into the two buffers $X_{PBUFF}$ (buffer that contains the data xi) and $T_{PBUFF}$ (buffer that contains the data ti). Subsequently, the maximum xj and the minimum xk of all the elements of the buffer $X_{BUFF}$ are calculated (steps 131*a* and 131*b*).

If the time index pkt of the local maximum xj found is not equal to the value of the index N, it means that the sample corresponding to the local maximum xj is not placed in the middle of the buffer $X_{PBUFF}$; in this case no peak was found and PKF="FALSE" (output NO from step 132*a*).

On the contrary, if the time index pkt of the local maximum xj found is equal to the value of the index N (output YES from step 132*a*), it means that the sample corresponding to the local maximum xj is placed in the middle of the buffer $X_{PBUFF}$; it occurs (step 133*a*) if the local maximum xj found is higher than PKTHRES (e.g., $PK_{THRES}$ chosen of a value equal to 15000 for the electrostatic charge variation signal). If so, the presence of a peak of width 2N+1 is confirmed and the variable PKF is set to "TRUE" (step 134*a*).

The amplitude of the peak found and confirmed is $x_N$, and the time index is $t_N$.

Dual considerations may be made for searching the negative peak.

In this case, if the time index vlt of the local minimum xk found is not equal to the value of the index N, it means that the sample corresponding to the local minimum xk is not placed in the middle of the buffer TPBUFF; in this case no peak was found and VLF="FALSE" (output NO from step 132*b*).

On the contrary, if the time index vlt of the local minimum xk found is equal to the value of the index N (output YES from step 132*b*), it means that the sample corresponding to the local minimum xk is placed in the middle of the buffer TPBUFF; it occurs (step 133*b*) if the local minimum xk found exceeds (for negative values) the threshold $VL_{THRES}$ (e.g., $VL_{THRES}$ chosen of a value equal to −15000 for the electrostatic charge variation signal). If so, the presence of a peak of width 2N+1 is confirmed and the variable VLF is set to "TRUE" (step 134*b*).

The amplitude of the negative peak found and confirmed is $x_N$, and the time index is $t_N$.

At the first start, the algorithm is not operative for a number of iterations equal to 2N+1, that is, until the buffers $X_{PBUFF}$ and $T_{PBUFF}$ are filled. In this step all the input samples will fill the buffers and the outputs are set to PKF="FALSE" and VLF="FALSE."

Figure 14:
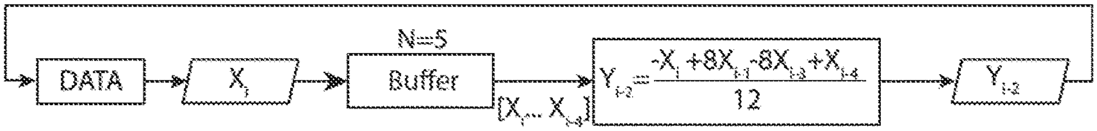
FIG. 14 illustrates, through a block diagram, a method for calculating the first derivative of the electrostatic charge variation signal of FIG. 4B, to obtain the signal of FIG. 4C.

FIG. 14 illustrates an algorithm or method for calculating the first derivative of the signals $S_P$, $S_A$ and $S_Q$, applicable in the context of the present disclosure.

The algorithm of FIG. 14 operates in real time, similarly to the methods previously described, that is the data is processed during the same acquisition step. It is assumed that the signal received at the input (which may be any of the modulus of the vibration signal $S_A$, the pressure signal $S_P$ and the electrostatic charge variation signal $S_Q$) has been converted into digital and therefore, hereinafter, the term "datum" identifies a sample or digital value, or sample, of the considered signal (e.g., signal amplitude in LSB or pressure value in mbar).

By definition, the output y is delayed by 2 samples with respect to the input; the first derivative of the input signal, calculated at time ti, relates to the input signal at time t(i−2). The two flows are therefore temporally aligned before calculating relative time distances.

Figure 15:
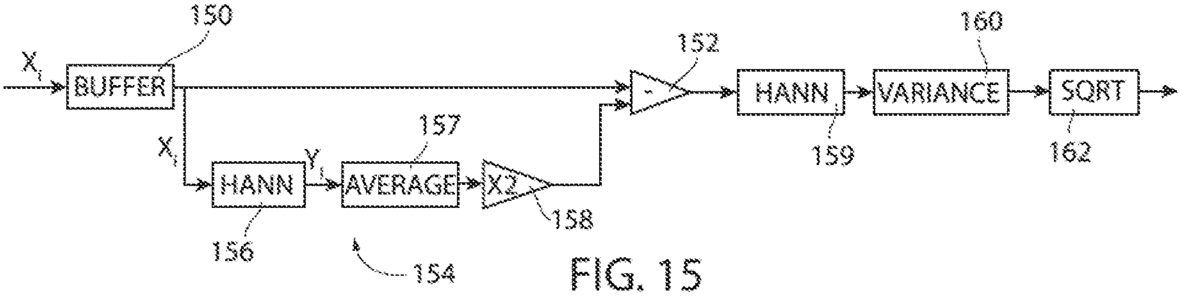
FIG. 15 illustrates, through a block diagram, a method for extracting the envelope, or AC component, usable to generate the vibration signal of FIG. 4D from the vibration signal of FIG. 3C.

With reference to FIG. 15, a method for extracting the envelope of the considered signal (any of the signals $S_P$, $S_A$ and $S_Q$), or for obtaining the aforementioned "AC component" (e.g., with reference to step 92), is illustrated through a block diagram.

With reference to FIG. 15, digital samples xi of the signal being processed are acquired and stored in the buffer 150. The buffer 150, in particular, is designed to store a plurality of samples (for example 25 samples, with a sampling rate of 50 Hz and buffers with a time window of 0.5 s). The number of samples may, in any case, vary as desired, considering that the greater this number, the smoother the signal generated at the output of the block chain of FIG. 15. For example, the number of samples in the buffer 150 is chosen in the range of 10-30.

The samples stored in the buffer 150 are sent to a first input of a subtraction block 152. The other input of the subtraction block 152 receives samples which are further processed (filtered) through the branch 154, as described hereinafter.

The branch 154 first comprises a processing block 155 which uses a Hann window 156, or Hann function, which is of a per se known type and implements the following function:

$$y_i = \frac{1}{2}x_i\left(1 - \cos\frac{2\pi i}{K}\right)$$

where $x_i=[x_0, \ldots, x_{K-1}]$ are the samples at the input in the processing block 155 (the subscript "i=0, . . . , K−1" identifies the i-th sample) and $y_i=[y_0, \ldots, y_{K-1}]$ are the samples at the output from the processing block 155.

The branch 154 comprises an averaging block 157, which receives the samples $y_1=[y_0, \ldots, y_{K-1}]$ and performs an arithmetic average operation of the value of said samples.

The branch 154 further comprises a multiplication block 158, which receives at input the average value generated at the output of block 157 and performs an operation of multiplication by 2 of said average value (since the Hann window of block 156 halves the average amplitude of the signal, the attenuation introduced is compensated with this operation), generating an output which is supplied to the second input of the subtraction block 152.

At the output of the subtraction block 152, the signal at the input in the subtraction block 152 minus its average value is obtained, therefore a signal which on average oscillates around zero, without any significant offset. The output of the subtraction block 152 is then further processed through a block 159 which implements a further Hann window, as it has been described for block 156. This further Hann window 159 has the function of smoothing the signal, smoothing the peaks and discontinuities at the ends of the analysis window.

A block 160 receives at input the array generated at the output of block 159, and performs an estimation of the variance of said array, in a per se known manner. The output from block 160 is consequently scalar.

Finally, a square root operation (block 162) of the variance value has the function of compressing the dynamic range of the output signal, as well as of bringing it back to the initial physical dimensions. In other words, the variance increases according to a power of two, and the square root restores the physical dimensions. For example, for the signal $S_A$, if the physical dimension at the input is expressed in V, after the calculation of the variance, it is expressed in $V^2$.

The advantages achieved by the present disclosure are apparent from the foregoing description.

In particular, the following advantages are obtained with respect to the prior art:

- insensitivity to environmental conditions;
- very low consumption when compared with other technologies (infrared, microwave, etc.);
- small size and ease of integration and installation;
- unlike common detectors, provided with "lenses" or antennas that constrain the spatial shape/arrangement thereof, the present disclosure may be physically organized on the basis of the application;
- reduced cost with respect to the known arts.

Further variations, with respect to what has been described, may also be provided.

For example, the present disclosure may be modified with respect to what has been described by excluding one of the pressure sensor 4 and the vibration sensor 7; in this case, the confirmation of human presence in the monitored environment is provided by the analysis steps of the electrostatic charge variation signal $S_Q$ combined with only one of the vibration signal SA and the pressure signal $S_P$. If the sensor excluded or not present is the pressure sensor, the environment wherein the presence of the subject is detected may not be a closed environment.

Furthermore, while the present disclosure has been described with explicit reference to the processing of digital signals, what has been described applies, in a per se apparent manner, to analog signals.

A system for detecting a presence in an environment to be monitored, may be summarized as including a processing unit (2); an electrostatic charge variation sensor (6), coupled to the processing unit (2), configured to detect a variation of electrostatic charge in said environment and generate an electrostatic charge variation signal ($S_Q$); and one of a vibration sensor (7) and an environmental pressure sensor (4), wherein the vibration sensor is operatively coupled to the environment to be monitored to detect an environmental vibration in the environment to be monitored and generate a vibration signal ($S_A$), and wherein the environmental pressure sensor (4) is operatively coupled to the environment to be monitored to detect an environmental pressure in the environment to be monitored and generate a pressure signal ($S_P$), wherein the processing unit (2) is configured to acquire, from the electrostatic charge variation sensor (6), the electrostatic charge variation signal ($S_Q$); detect, in said electrostatic charge variation signal ($S_Q$), first signal characteristics indicative of the presence of a subject in said environment to be monitored; acquire, from said one of the vibration sensor (7) and the environmental pressure sensor (4), respectively the vibration signal ($S_A$) or the pressure signal ($S_P$); detect, in said vibration signal ($S_A$) or pressure signal ($S_P$) acquired, respective second signal characteristics indicative of the presence of the subject in said environment to be monitored; and generate a warning signal if both the first and the second signal characteristics have been detected.

The system may further include the other of the vibration sensor (7) and the environmental pressure sensor (4), wherein the processing unit (2) is further configured to acquire, from the other of said vibration sensor (7) and environmental pressure sensor (4), respectively the vibration signal ($S_A$) or the pressure signal (SP); detect, in said other of the vibration signal ($S_A$) and the pressure signal ($S_P$) acquired, respective third signal characteristics indicative of the presence of the subject in said environment to be monitored; and generate the warning signal if all the first, the second and the third signal characteristics have been detected.

The operation of detecting the first signal characteristics may include detecting, in the electrostatic charge variation signal ($S_Q$), the following characteristics which follow each other in temporal order: a first rising edge; a first local maximum; a first falling edge; a first local minimum; a second rising edge; alternatively, detecting, in the electrostatic charge variation signal ($S_Q$), the following characteristics which follow each other in temporal order: a falling edge; a first local minimum; a first rising edge; a first local maximum; a second falling edge.

The operation of detecting the first signal characteristics nay further include performing a comparison of said local maximums and minimums with respective thresholds; and assessing, through comparison with respective thresholds, a value of steepness or rising rate of the first and the second rising edges and of steepness or falling rate of the falling edge.

The operation of detecting, in the electrostatic charge variation signal ($S_Q$), the characteristics that follow each other in temporal order may include calculating the first derivative ($S_Q'$) of the electrostatic charge variation signal ($S_Q$); identifying, in the electrostatic charge variation signal ($S_Q$) and in the first derivative signal ($S_Q'$), a respective plurality of positive and negative peaks; detecting one of the following time series a) and b) with which said plurality of positive and negative peaks follow each other over time a) a first positive peak (P1) in the first derivative signal ($S_Q'$); a second positive peak (P2) in the electrostatic charge variation signal ($S_Q$); a first negative peak (P3) in the first derivative signal ($S_Q'$); a second negative peak (P4) in the electrostatic charge variation signal ($S_Q$); a third positive peak (P5) in the first derivative signal ($S_Q'$), b) a third negative peak in the first derivative signal ($S_Q'$); a fourth negative peak in the electrostatic charge variation signal ($S_Q$); a fourth positive peak in the first derivative signal ($S_Q'$); a fifth positive peak in the electrostatic charge variation signal ($S_Q$); a fifth negative peak in the first derivative signal ($S_Q'$).

The operation of detecting the first signal characteristics may further include detecting one or more of the following time relationships:

$$T1=T3+T4$$

$$T6=T2+T3$$

$$T7=T4+T5$$

$$T8=T6+T7$$

wherein T1 may be a time interval between the second positive peak (P2) and the second negative peak (P4), T2 may be a time interval between the second positive peak (P2) and the first positive peak (P1), T3 may be a time interval between the second positive peak (P2) and the first negative peak (P3), T4 may be a time interval between the second negative peak (P4) and the first negative peak (P3), T5 may be a time interval between the second negative peak (P4) and the third positive peak (P5), T6 may be a time interval between the first positive peak (P1) and the first negative peak (P3), T7 may be a time interval between the first negative peak (P3) and the third positive peak (P5), T8 may be a time interval between the first positive peak (P1) and the third positive peak (P5).

Said time intervals T1-T7 may be respective time distances between respective maximum or minimum points of the positive and negative peaks.

The operation of detecting the first signal characteristics may further include detecting one or more of the following time relationships: $T2_{TH\_L}<T2<T2_{TH\_H}$, $T3_{TH\_L}<T3<T3_{TH\_H}$, $T4_{TH\_L}<T4<T4_{TH\_H}$, $T5_{TH\_L}<T5<T5_{TH\_H}$, where $T2_{TH\_L}$, $T3_{TH\_L}$, $T4_{TH\_L}$ and $T5_{TH\_L}$ may be respective lower thresholds of respective value including between 30 and 70 ms, and $T2_{TH\_H}$, $T3_{TH\_H}$, $T4_{TH\_H}$ and $T5_{TH\_H}$ are respective higher thresholds of respective value including between 150-250 ms.

The second signal characteristics may belong to the pressure signal ($S_P$), and said operation of detecting in said pressure signal ($S_P$) the second signal characteristics may include detecting a time amplitude value and maximum value of a pressure peak present in said pressure signal ($S_P$); calculating a first comparison parameter which is a function of the ratio between said time amplitude value and maximum value of the pressure peak; verifying whether said first comparison parameter is in a predetermined relationship with a first threshold.

Detecting a time amplitude value may include calculating an integral of, or an area subtended by, the pressure peak present in said pressure signal ($S_P$), and said first comparison parameter may be calculated by dividing the result of said integral of the pressure peak, or the value of said area subtended by the pressure peak, by the maximum value of the pressure peak.

The third signal characteristics belong to the vibration signal ($S_A$), and said operation of detecting in said vibration signal ($S_A$) the third signal characteristics may include detecting a time amplitude value and maximum value of a vibration peak present in said vibration signal ($S_A$); calculating a second comparison parameter which is a function of the ratio between said time amplitude value and maximum value of the vibration peak; verifying whether said second comparison parameter is in a predetermined relationship with a second threshold.

Detecting a time amplitude value may include calculating an integral of, or an area subtended by, the vibration peak present in said vibration signal ($S_A$), and said second comparison parameter may be calculated by dividing the result of said integral of the vibration peak, or the value of said area subtended by the vibration peak, by the maximum value of the vibration peak.

A method for detecting a presence in an environment to be monitored, may be summarized as including the steps of detecting, through an electrostatic charge variation sensor (6), a variation of electrostatic charge in said environment and generating an electrostatic charge variation signal ($S_Q$); detecting, through a vibration sensor (7) operatively coupled to the environment to be monitored, an environmental vibration in the environment to be monitored and generating a vibration signal ($S_A$); alternatively detecting, through an environmental pressure sensor (4) operatively coupled to the environment to be monitored, an environmental pressure in the environment to be monitored and generating a pressure signal ($S_P$), acquiring, through a processing unit (2) from the electrostatic charge variation sensor (6), the electrostatic charge variation signal ($S_Q$); detecting, through the processing unit (2) in said electrostatic charge variation signal ($S_Q$), first signal characteristics indicative of the presence of a subject in said environment to be monitored; acquiring, through the processing unit (2) from said one of the vibration sensor (7) and the environmental pressure sensor (4), respectively the vibration signal ($S_A$) or the pressure signal ($S_P$); detecting, through the processing unit (2), in said vibration signal ($S_A$) or pressure signal ($S_P$) acquired, respective second signal characteristics indicative of the presence of the subject in said environment to be monitored; and generating, through the processing unit (2), a warning signal if both the first and the second signal characteristics have been detected.

The method may further include the other step of detecting the environmental vibration and generating a vibration signal ($S_A$) or detecting the environmental pressure and generating a pressure signal ($S_P$), and further including the steps, performed by the processing unit (2), of acquiring, from the other of said vibration sensor (7) and environmental pressure sensor (4), respectively the vibration signal ($S_A$) or the pressure signal ($S_P$); detecting, in said other of the vibration signal ($S_A$) and the pressure signal ($S_P$) acquired, respective third signal characteristics indicative of the presence of the subject in said environment to be monitored; and generating the warning signal if all the first, the second and the third signal characteristics have been detected.

The step of detecting the first signal characteristics may include detecting, in the electrostatic charge variation signal ($S_Q$), the following characteristics which follow each other in temporal order: a first rising edge; a first local maximum; a first falling edge; a first local minimum; a second rising edge; alternatively, detecting, in the electrostatic charge variation signal ($S_Q$), the following characteristics which follow each other in temporal order: a falling edge; a first local minimum; a first rising edge; a first local maximum; a second falling edge.

The step of detecting the first signal characteristics may further include performing a comparison of said local maximums and minimums with respective thresholds; and assessing, through comparison with respective thresholds, a value of steepness or rising rate of the first and the second rising edges and of steepness or falling rate of the falling edge.

Detecting, in the electrostatic charge variation signal ($S_Q$), the characteristics that follow each other in temporal order may include calculating the first derivative ($S_Q'$) of the electrostatic charge variation signal ($S_Q$); identifying, in the electrostatic charge variation signal ($S_Q$) and in the first derivative signal ($S_Q'$), a respective plurality of positive and negative peaks; detecting one of the following time series a) and b) with which said plurality of positive and negative peaks follow each other over time a) a first positive peak (P1) in the first derivative signal ($S_Q'$); a second positive peak (P2) in the electrostatic charge variation signal ($S_Q$); a first negative peak (P3) in the first derivative signal ($S_Q'$); a second negative peak (P4) in the electrostatic charge variation signal ($S_Q$); a third positive peak (P5) in the first derivative signal ($S_Q'$), b) a third negative peak in the first derivative signal ($S_Q'$); a fourth negative peak in the electrostatic charge variation signal ($S_Q$); a fourth positive peak in the first derivative signal ($S_Q'$); a fifth positive peak in the electrostatic charge variation signal ($S_Q$); a fifth negative peak in the first derivative signal ($S_Q'$).

The step of detecting the first signal characteristics may further include detecting one or more of the following time relationships:

$$T1=T3+T4$$

$$T6=T2+T3$$

$$T7=T4+T5$$

$$T8=T6+T7$$

wherein T1 may be a time interval between the second positive peak (P2) and the second negative peak (P4), T2 may be a time interval between the second positive peak (P2) and the first positive peak (P1), T3 may be a time interval between the second positive peak (P2) and the first negative peak (P3), T4 may be a time interval between the second negative peak (P4) and the first negative peak (P3), T5 may be a time interval between the second negative peak (P4) and the third positive peak (P5), T6 may be a time interval between the first positive peak (P1) and the first negative peak (P3), T7 may be a time interval between the first negative peak (P3) and the third positive peak (P5), T8 may be a time interval between the first positive peak (P1) and the third positive peak (P5).

Said time intervals T1-T7 may be respective time distances between respective maximum or minimum points of the positive and negative peaks.

The step of detecting the first signal characteristics may further include detecting one or more of the following time relationships: $T2_{TH\_L}<T2<T2_{TH\_H}$, $T3_{TH\_L}<T3<T3_{TH\_H}$, $T4_{TH\_L}<T4<T4_{TH\_H}$, $T5_{TH\_L}<T5<T5_{TH\_H}$, where $T2_{TH\_L}$, $T3_{TH\_L}$, $T4_{TH\_L}$ and $T5_{TH\_L}$ may be respective lower thresholds of respective value including between 30 and 70 ms, and $T2_{TH\_H}$, $T3_{TH\_H}$, $T4_{TH\_H}$ and $T5_{TH\_H}$ are respective higher thresholds of respective value including between 150-250 ms.

The second signal characteristics belong to the pressure signal ($S_P$), and wherein said step of detecting in said pressure signal ($S_P$) the second signal characteristics may include detecting a time amplitude value and maximum value of a pressure peak present in said pressure signal ($S_P$); calculating a first comparison parameter which is a function of the ratio between said time amplitude value and maximum value of the pressure peak; verifying whether said first comparison parameter is in a predetermined relationship with a first threshold.

Detecting a time amplitude value may include calculating an integral of, or an area subtended by, the pressure peak present in said pressure signal ($S_P$), and said first comparison parameter may be calculated by dividing the result of said integral of the pressure peak, or the value of said area subtended by the pressure peak, by the maximum value of the pressure peak.

The third signal characteristics belong to the vibration signal ($S_A$), and said step of detecting in said vibration signal ($S_A$) the third signal characteristics may include detecting a time amplitude value and maximum value of a vibration peak present in said vibration signal ($S_A$); calculating a second comparison parameter which may be a function of the ratio between said time amplitude value and maximum value of the vibration peak; verifying whether said second comparison parameter is in a predetermined relationship with a second threshold.

Detecting a time amplitude value may include calculating an integral of, or an area subtended by, the vibration peak present in said vibration signal ($S_A$), and said second comparison parameter may be calculated by dividing the result of said integral of the vibration peak, or the value of said area subtended by the vibration peak, by the maximum value of the vibration peak.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system for detecting a presence in an environment to be monitored, comprising:

a processor;

an electrostatic charge variation sensor coupled to the processor and configured to detect a variation of electrostatic charge in said environment and generate an electrostatic charge variation signal; and one of a vibration sensor operatively coupled to the environment to be monitored and configured to detect an environmental vibration in the environment to be monitored and generate a vibration signal, or an environmental pressure sensor operatively coupled to the environment to be monitored and configured to detect an environmental pressure in the environment to be monitored and generate a pressure signal, wherein the processor is configured to:

acquire, from the electrostatic charge variation sensor, the electrostatic charge variation signal;

detect, in said electrostatic charge variation signal, first signal characteristics indicative of the presence of a subject in said environment to be monitored;

acquire, from said one of the vibration sensor or the environmental pressure sensor, respectively the vibration signal or the pressure signal;

detect, in said vibration signal or pressure signal acquired, respective second signal characteristics indicative of the presence of the subject in said environment to be monitored; and generate a warning signal if both the first and the second signal characteristics have been detected.

2. The system according to claim 1, further comprising the other of the vibration sensor or the environmental pressure sensor, wherein the processor is further configured to:

acquire, from the other of said vibration sensor or environmental pressure sensor, respectively the vibration signal or the pressure signal;

detect, in said other of the vibration signal or the pressure signal acquired, respective third signal characteristics indicative of the presence of the subject in said environment to be monitored; and generate the warning signal if all the first, the second, and the third signal characteristics have been detected.

3. The system according to claim 1, wherein the detecting the first signal characteristics includes:

detecting, in the electrostatic charge variation signal, the following characteristics which follow each other in temporal order: a first rising edge; a first local maximum; a first falling edge; a first local minimum; a second rising edge; and alternatively, detecting, in the electrostatic charge variation signal, the following characteristics which follow each other in temporal order: a falling edge; a first local minimum; a first rising edge; a first local maximum; and a second falling edge.

4. The system according to claim 3, wherein the detecting the first signal characteristics further includes:

performing a comparison of said local maximums and minimums with respective thresholds; and assessing, through comparison with respective thresholds, a value of steepness or rising rate of the first and the second rising edges and of steepness or falling rate of the falling edge.

5. The system according to claim 3, wherein the detecting, in the electrostatic charge variation signal, the characteristics that follow each other in temporal order includes:

calculating a first derivative signal of the electrostatic charge variation signal;

identifying, in the electrostatic charge variation signal and in the first derivative signal, a respective plurality of positive and negative peaks; and detecting one of the following time series a) and b) with which said plurality of positive and negative peaks follow each other over time:

a) a first positive peak in the first derivative signal; a second positive peak in the electrostatic charge variation signal; a first negative peak in the first derivative signal; a second negative peak in the electrostatic charge variation signal; a third positive peak in the first derivative signal, and b) a third negative peak in the first derivative signal; a fourth negative peak in the electrostatic charge variation signal; a fourth positive peak in the first derivative signal; a fifth positive peak in the electrostatic charge variation signal; a fifth negative peak in the first derivative signal.

6. The system according to claim 5, wherein the detecting the first signal characteristics further includes detecting one or more of the following time relationships:

$$T1=T3+T4$$

$$T6=T2+T3$$

$$T7=T4+T5$$

$$T8=T6+T7$$

wherein:

T1 is a time interval between the second positive peak and the second negative peak, T2 is a time interval between the second positive peak and the first positive peak, T3 is a time interval between the second positive peak and the first negative peak, T4 is a time interval between the second negative peak and the first negative peak, T5 is a time interval between the second negative peak and the third positive peak, T6 is a time interval between the first positive peak and the first negative peak, T7 is a time interval between the first negative peak and the third positive peak, T8 is a time interval between the first positive peak and the third positive peak.

7. The system according to claim 6, wherein said time intervals T1 through T7 are respective time distances between respective maximum or minimum points of the positive and negative peaks.

8. The system according to claim 6, wherein the detecting the first signal characteristics further includes detecting one or more of the following time relationships:

$T2_{TH\_L}<T2<T2_{TH\_H}$, $T3_{TH\_L}<T3<T3_{TH\_H}$, $T4_{TH\_L}<T4<T4_{TH\_H}$, $T5_{TH\_L}<T5<T5_{TH\_H}$, where $T2_{TH\_L}$, $T3_{TH\_L}$, $T4_{TH\_L}$ and $T5_{TH\_L}$ may be respective lower thresholds of respective value between 30 and 70 ms, and $T2_{TH\_H}$, $T3_{TH\_H}$, $T4_{TH\_H}$ and $T5_{TH\_H}$ are respective higher thresholds of respective value including between 150 and 250 ms.

9. The system according to claim 1, wherein the second signal characteristics belong to the pressure signal, and wherein said detecting in said pressure signal the second signal characteristics includes:

detecting a time amplitude value and maximum value of a pressure peak present in said pressure signal;

calculating a first comparison parameter which is a function of a ratio between said time amplitude value and maximum value of the pressure peak; and verifying whether said first comparison parameter is in a predetermined relationship with a first threshold.

10. The system according to claim 9, wherein detecting a time amplitude value includes calculating an integral of, or an area subtended by, the pressure peak present in said pressure signal, and wherein said first comparison parameter is calculated by dividing the result of said integral of the pressure peak, or the value of said area subtended by the pressure peak, by the maximum value of the pressure peak.

11. The system according to claim 2, wherein the third signal characteristics belong to the vibration signal, and wherein said detecting in said vibration signal the third signal characteristics includes:

detecting a time amplitude value and maximum value of a vibration peak present in said vibration signal;

calculating a second comparison parameter which is a function of a ratio between said time amplitude value and maximum value of the vibration peak; and verifying whether said second comparison parameter is in a predetermined relationship with a second threshold.

12. The system according to claim 11, wherein detecting a time amplitude value includes calculating an integral of, or an area subtended by, the vibration peak present in said vibration signal, and wherein said second comparison parameter is calculated by dividing the result of said integral of the vibration peak, or the value of said area subtended by the vibration peak, by the maximum value of the vibration peak.

13. A method for detecting a presence in an environment to be monitored, comprising:

detecting, by an electrostatic charge variation sensor, a variation of electrostatic charge in said environment and generating an electrostatic charge variation signal;

detecting, by one of a vibration sensor or an environmental sensor operatively coupled to the environment to be monitored, respectively, an environmental vibration in the environment to be monitored and generating a vibration signal or an environmental pressure in the environment to be monitored and generating a pressure signal;

acquiring, by a processor, from the electrostatic charge variation sensor, the electrostatic charge variation signal;

detecting, by the processor, in said electrostatic charge variation signal, first signal characteristics indicative of the presence of a subject in said environment to be monitored;

acquiring, by the processor, from said one of the vibration sensor or the environmental sensor, respectively the vibration signal or the pressure signal;

detecting, by the processor, in said vibration signal or pressure signal acquired, respective second signal characteristics indicative of the presence of the subject in said environment to be monitored; and generating, by the processor, a warning signal if both the first and the second signal characteristics have been detected.

14. The method according to claim 13, further comprising:

detecting the environmental vibration and generating the vibration signal or detecting the environmental pressure and generating the pressure signal, by the other of the vibration sensor and the environmental pressure sensor;

acquiring, from the other of said vibration sensor and environmental pressure sensor, respectively the vibration signal or the pressure signal;

detecting, in said other of the vibration signal and the pressure signal acquired, respective third signal characteristics indicative of the presence of the subject in said environment to be monitored; and generating the warning signal if all the first, the second, and the third signal characteristics have been detected.

15. The method according to claim 13, wherein the detecting the first signal characteristics includes:

detecting, in the electrostatic charge variation signal, the following characteristics which follow each other in temporal order: a first rising edge; a first local maximum; a first falling edge; a first local minimum; a second rising edge; and alternatively, detecting, in the electrostatic charge variation signal, the following characteristics which follow each other in temporal order: a falling edge; a first local minimum; a first rising edge; a first local maximum; and a second falling edge.

16. The method according to claim 15, wherein the detecting the first signal characteristics further includes:

performing a comparison of said local maximums and minimums with respective thresholds; and assessing, through comparison with respective thresholds, a value of steepness or rising rate of the first and the second rising edges and of steepness or falling rate of the falling edge.

17. The method according to claim 15, wherein detecting, in the electrostatic charge variation signal, the characteristics that follow each other in temporal order includes:

calculating a first derivative signal of the electrostatic charge variation signal;

identifying, in the electrostatic charge variation signal and in the first derivative signal, a respective plurality of positive and negative peaks; and detecting one of the following time series a) and b) with which said plurality of positive and negative peaks follow each other over time:

a) a first positive peak in the first derivative signal; a second positive peak in the electrostatic charge variation signal; a first negative peak in the first derivative signal; a second negative peak in the electrostatic charge variation signal; a third positive peak in the first derivative signal, and b) a third negative peak in the first derivative signal; a fourth negative peak in the electrostatic charge variation signal; a fourth positive peak in the first derivative signal; a fifth positive peak in the electrostatic charge variation signal; a fifth negative peak in the first derivative signal.

18. The method according to claim 17, wherein the detecting the first signal characteristics further includes detecting one or more of the following time relationships:

$$T1=T3+T4$$

$$T6=T2+T3$$

$$T7=T4+T5$$

$$T8=T6+T7$$

wherein:

T1 is a time interval between the second positive peak and the second negative peak, T2 is a time interval between the second positive peak and the first positive peak, T3 is a time interval between the second positive peak and the first negative peak, T4 is a time interval between the second negative peak and the first negative peak, T5 is a time interval between the second negative peak and the third positive peak, T6 is a time interval between the first positive peak and the first negative peak, T7 is a time interval between the first negative peak and the third positive peak, T8 is a time interval between the first positive peak and the third positive peak.

19. The method according to claim 18, wherein said time intervals T1 through T7 are respective time distances between respective maximum or minimum points of the positive and negative peaks.

20. The method according to claim 18, wherein the detecting the first signal characteristics further includes detecting one or more of the following time relationships:

$T2_{TH\_L}<T2<T2_{TH\_H}$, $T3_{TH\_L}<T3<T3_{TH\_H}$, $T4_{TH\_L}<T4<T4_{TH\_H}$, $T5_{TH\_L}<T5<T5_{TH\_H}$, where $T2_{TH\_L}$, $T3_{TH\_L}$, $T4_{TH\_L}$ and $T5_{TH\_L}$ may be respective lower thresholds of respective value between 30 and 70 ms, and $T2_{TH\_H}$, $T3_{TH\_H}$, $T4_{TH\_H}$ and $T5_{TH\_H}$ are respective higher thresholds of respective value including between 150 and 250 ms.

21. The method according to claim 13, wherein the second signal characteristics belong to the pressure signal, and wherein said detecting in said pressure signal the second signal characteristics includes:

detecting a time amplitude value and maximum value of a pressure peak present in said pressure signal;

calculating a first comparison parameter which is a function of a ratio between said time amplitude value and maximum value of the pressure peak; and verifying whether said first comparison parameter is in a predetermined relationship with a first threshold.

22. The method according to claim 21, wherein detecting a time amplitude value includes calculating an integral of, or an area subtended by, the pressure peak present in said pressure signal, and wherein said first comparison parameter is calculated by dividing the result of said integral of the pressure peak, or the value of said area subtended by the pressure peak, by the maximum value of the pressure peak.

23. The method according to claim 14, wherein the third signal characteristics belong to the vibration signal, and wherein said detecting in said vibration signal the third signal characteristics includes:

detecting a time amplitude value and maximum value of a vibration peak present in said vibration signal;

calculating a second comparison parameter which is a function of a ratio between said time amplitude value and maximum value of the vibration peak; and verifying whether said second comparison parameter is in a predetermined relationship with a second threshold.

24. The method according to claim 23, wherein detecting a time amplitude value includes calculating an integral of, or an area subtended by, the vibration peak present in said vibration signal, and wherein said second comparison parameter is calculated by dividing the result of said integral of the vibration peak, or the value of said area subtended by the vibration peak, by the maximum value of the vibration peak.

* * * * *